US012387606B2

(12) United States Patent
Chen et al.

(10) Patent No.: US 12,387,606 B2
(45) Date of Patent: Aug. 12, 2025

(54) SYSTEMS AND METHODS FOR PERSONAL MOBILE VEHICLE LOCALIZATION IN A FLEET MANAGEMENT SYSTEM

(71) Applicant: Lyft, Inc., San Francisco, CA (US)

(72) Inventors: Amber L Chen, Brooklyn, NY (US); Garrett Korda Drayna, San Carlos, CA (US); Martin Douglas Kess, New York, NY (US); Christopher Paul Merrill, San Francisco, CA (US); Thien Bao Nguyen, San Jose, CA (US); Jens Paul Windau, San Francisco, CA (US); Yunjie Zhao, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 239 days.

(21) Appl. No.: 17/688,698

(22) Filed: Mar. 7, 2022

(65) Prior Publication Data
US 2022/0383751 A1 Dec. 1, 2022

Related U.S. Application Data

(60) Provisional application No. 63/194,805, filed on May 28, 2021.

(51) Int. Cl.
| | |
|---|---|
| *G08G 1/00* | (2006.01) |
| *G06N 3/084* | (2023.01) |
| *H04W 4/02* | (2018.01) |
| *H04W 4/021* | (2018.01) |
| *H04W 4/029* | (2018.01) |
| *H04W 4/40* | (2018.01) |

(52) U.S. Cl.
CPC ............ *G08G 1/205* (2013.01); *G06N 3/084* (2013.01); *H04W 4/021* (2013.01); *H04W 4/026* (2013.01); *H04W 4/027* (2013.01); *H04W 4/029* (2018.02); *H04W 4/40* (2018.02)

(58) Field of Classification Search
CPC ....... G08G 1/205; G06N 3/084; H04W 4/021; H04W 4/026; H04W 4/027; H04W 4/029; H04W 4/40
See application file for complete search history.

(56) References Cited

U.S. PATENT DOCUMENTS

| | | | | |
|---|---|---|---|---|
| 2016/0146616 | A1* | 5/2016 | Ren | G01C 21/165 |
| | | | | 701/409 |
| 2018/0033300 | A1* | 2/2018 | Hansen | G08G 1/096791 |
| 2019/0357005 | A1* | 11/2019 | Brady | H04W 4/40 |
| 2020/0003563 | A1* | 1/2020 | Miyake | B60W 30/18163 |
| 2020/0151916 | A1* | 5/2020 | Kenney | G06T 11/60 |
| 2020/0370890 | A1* | 11/2020 | Hamilton | G08G 1/04 |
| 2021/0004759 | A1* | 1/2021 | Arunachalam | H04L 67/12 |
| 2021/0005089 | A1* | 1/2021 | Seagraves | G08G 1/205 |
| 2021/0165404 | A1* | 6/2021 | Gillett | G01C 21/3691 |
| 2021/0213971 | A1* | 7/2021 | Shen | G06V 10/774 |
| 2021/0365694 | A1* | 11/2021 | Lee | G06V 20/588 |

(Continued)

*Primary Examiner* — Hunter B Lonsberry
*Assistant Examiner* — Harrison Heflin
(74) *Attorney, Agent, or Firm* — Baker Botts L.L.P.

(57) ABSTRACT

Embodiments described herein provide a localization mechanism that blends location data collected from hardware sensors equipped with a personal mobile vehicle and location and/or status data collected from external location source other than the personal mobile vehicle to generate adjusted location data for the personal mobile vehicle.

20 Claims, 18 Drawing Sheets

(56) References Cited

U.S. PATENT DOCUMENTS

| | | | |
|---|---|---|---|
| 2022/0073108 A1* | 3/2022 | Park | B60W 10/20 |
| 2022/0111859 A1* | 4/2022 | Lu | G01C 21/3453 |
| 2022/0299656 A1* | 9/2022 | Cui | G01S 19/49 |
| 2022/0357464 A1* | 11/2022 | Peng | H04W 4/40 |
| 2023/0009012 A1* | 1/2023 | Kai | G06T 7/70 |
| 2023/0221126 A1* | 7/2023 | Ogata | G01C 21/30 |
| | | | 701/412 |
| 2023/0221451 A1* | 7/2023 | Choi | G01S 7/4808 |
| | | | 701/445 |

* cited by examiner

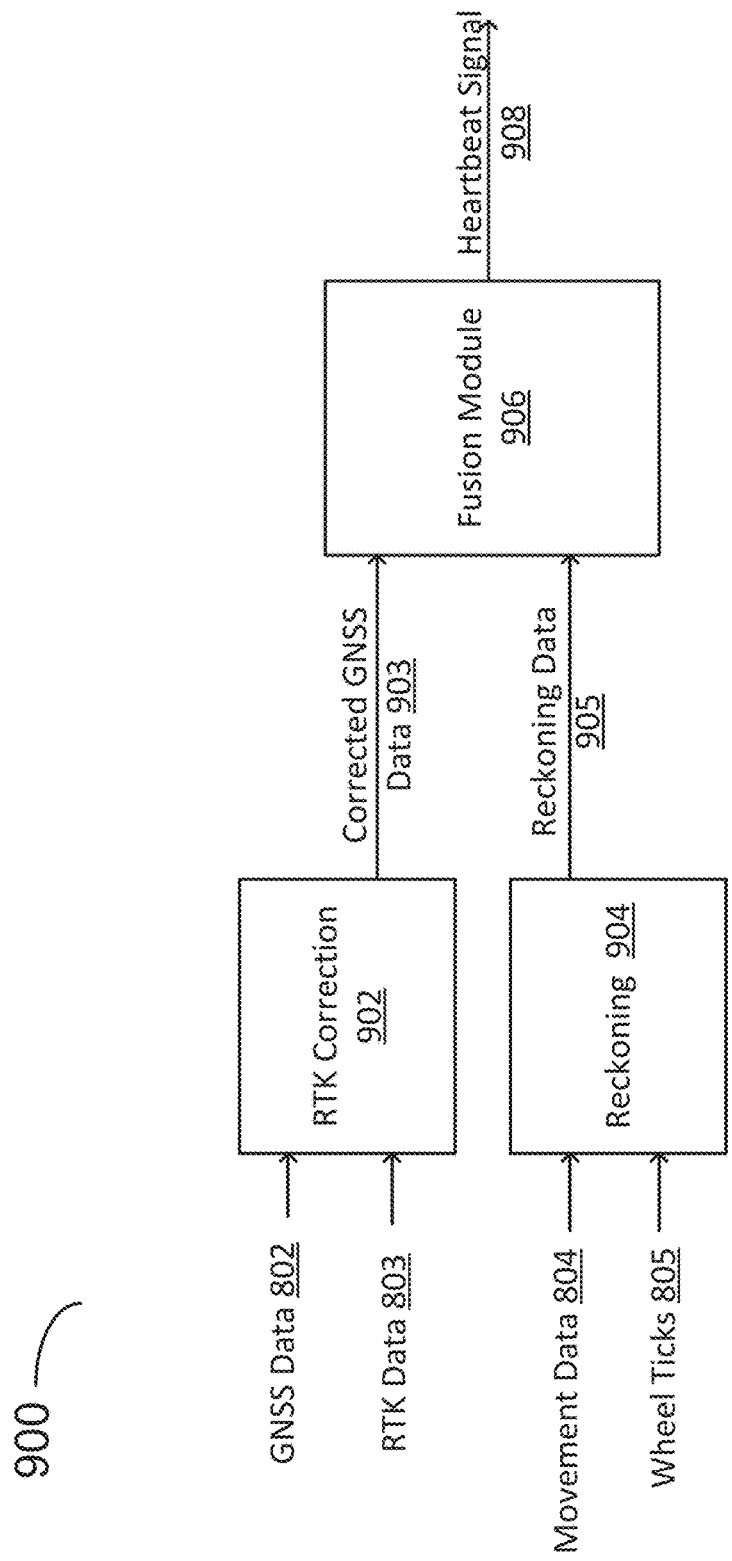

Method 1100

SYSTEMS AND METHODS FOR PERSONAL MOBILE VEHICLE LOCALIZATION IN A FLEET MANAGEMENT SYSTEM

CROSS REFERENCE(S)

The instant application is a nonprovisional of and claims priority under 35 U.S.C. 119 to U.S. provisional application No. 63/194,805, filed on May 28, 2021, which is hereby expressly incorporated by reference herein in its entirety.

FIELD OF THE INVENTION

The present technology relates to vehicle systems and fleet management systems. More particularly, the present technology relates to systems, apparatus, and methods for personal mobile vehicle localization in a fleet management system.

BACKGROUND

Commercial personal mobile vehicles (PMVs), such as bicycles, scooters, electric skateboards, and/or the like, have been widely used by a fleet management system to be shared among riders. For example, a shared rider may operate a user device to unlock and remove a PMV from a docking station, and return the PMV to the same or a different docking station after the rider has completed use of the shared PMV. As the shared PMVs may be distributed at various places, for example, at docking stations, at the warehouse of the fleet management system, on a public transit system, in motion with a rider, and/or the like, the fleet management system may often need to track and record the location of the PMV.

Therefore, there is a need for accurate PMV localization in a fleet management system.

SUMMARY

Various embodiments of the present technology can include systems, methods, and non-transitory computer readable media configured to determine a location of a personal mobility vehicle, the method comprising, by a fleet management system. Specifically, a first location signal associated with a first location coordinate generated by a sensor associated with the personal mobility vehicle may be received from a personal mobility vehicle managed by the fleet management system. A second signal indicative of a second location coordinate of the personal mobility vehicle is received from an external location source in the environment external of the personal mobility vehicle. The external location source is associated with the fleet management system. The server then determines an adjusted location coordinate for the personal mobility vehicle by adjusting a first weight value associated with the first location coordinate with a second weight value associated with the second location coordinate based on contextual data associated with the environment using at least one of the first location coordinate or the second location coordinate. Operations may then be executed for managing the personal mobility vehicle based on the adjusted location coordinate.

In one embodiment, a method of determining a location of a personal mobility vehicle is disclosed. The method comprises receiving, from the personal mobility vehicle, a global navigation satellite system (GNSS) signal indicating GNSS coordinates of the personal mobility vehicle, receiving, from the personal mobility vehicle, a message indicating wireless location data of the personal mobility vehicle, generating a geolocation query input based at least in part on the GNSS coordinates and the wireless location data, generating, a geolocation indication of the personal mobility vehicle in response to the geolocation query input, and associating the geolocation indication with the personal mobility vehicle according to a first timestamp.

In one embodiment, a system of determining a location of a personal mobility vehicle is disclosed. The system comprises a communication interface, a memory and a processor. The communication interface is configured to receive, from the personal mobility vehicle, a global navigation satellite system (GNSS) signal indicating GNSS coordinates of the personal mobility vehicle, and receive, from the personal mobility vehicle, a message indicating wireless positioning data of the personal mobility vehicle. The memory stores a plurality of processor-executable instructions. The processor executes the plurality of processor-executable instructions to generate a geolocation query input based at least in part on the GNSS coordinates and the wireless positioning data, generate a geolocation indication of the personal mobility vehicle in response to the geolocation query input, and associate the geolocation indication with the personal mobility vehicle according to a first timestamp.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
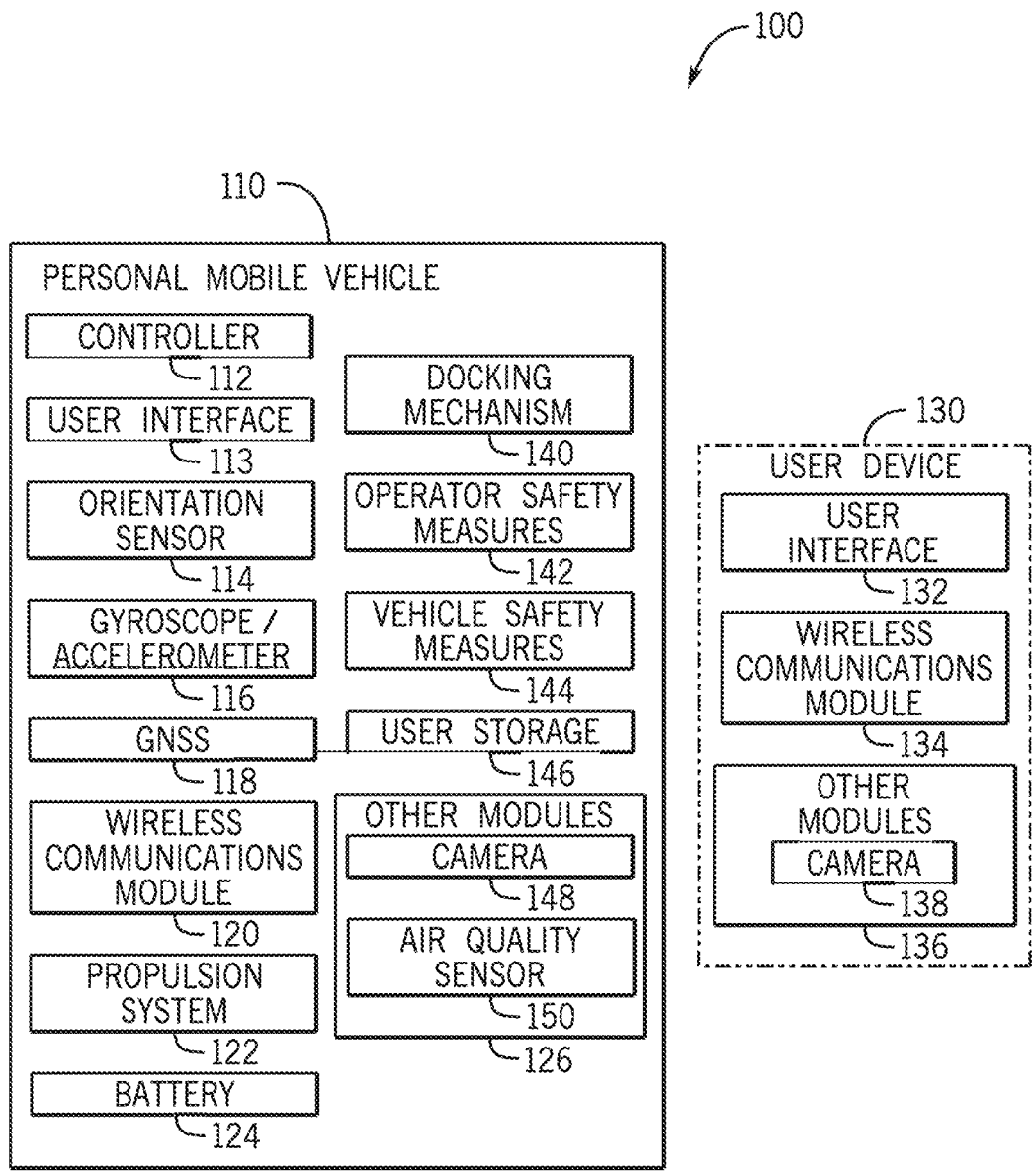
FIG. 1 illustrates a block diagram of a portion of a dynamic transportation matching system including a PMV in accordance with an embodiment of the disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Traditionally, the PMV is equipped with a global positioning system (GPS) component, which provides a GPS signal to the fleet management system indicating the GPS location of the PMV. However, GPS signals can often experience jitters, e.g., even for a PMV that is not moving, the PMV can often return wildly varying locations during a period of time. In some scenarios when GPS signals are not available, e.g., the GPS component is out of battery, the fleet management system may even lose track of the location of the PMV.

In view of the need to provide accurate localization of shareable PMVs in a fleet management system, embodiments described herein provide a localization mechanism that blends location data collected from hardware sensors equipped with a PMV and location and/or status data collected from external location source other than the PMV to generate adjusted location data for the PMV. For example, a server may receive location data such as global navigation satellite system (GNSS) data, real-time kinematics (RTK) data, movement data, and/or the like that are collected by sensors on a PMV. The server may also receive location or status data relating to the PMV from an external location source that is external to the PMV, such as, but not limited to access point scan data from an access point of a WiFi network that the PMV is connected to, Bluetooth tag data from a Bluetooth check-in point, status data indicating the PMV is checked in at a docking station from the docking station, status data indicating the PMV is checked in at a warehouse from the warehouse, and/or the like. For another example, the external location data may include GNSS data of a user device that has scanned and checked out the PMV from a docking station, application usage data of the user device, and/or the like.

In one embodiment, the server may adopt a fusion model, such as a machine learning model, to blend the location data from the PMV and the various location indicators from external sources to generate an adjusted location of the PMV. In this way, the multi-dimensional data blending from various sources may enhance the confidence level of the determined location of the PMV.

In one embodiment, the PMV may capture various location data through sensors equipped with the PMV, such as the GNSS data, RTK data, movement data (e.g., inertial measurement data, wheel ticks, etc.), and/or the like, and dynamically blend the various location data into a fused location signal to send to the server. For example, Kalman filter fusion with dynamic weighting may be applied to various location data signals to generate a weighted location signal. The weighted location signal may be updated periodically, intermittently, or on an on-demand basis.

FIG. 1 illustrates a block diagram of a portion of a dynamic transportation matching system 100 (e.g., system 100) including a PMV 110 in accordance with an embodiment of the disclosure. In the embodiment shown in FIG. 1, system 100 includes PMV 110 and optionally a user device 130. In general, PMV 110 may be a passenger vehicle designed to transport a single person (e.g., a micromobility PMV, a transit bike and scooter vehicle, or the like) or a group of people (e.g., a typical car or truck). More specifically, PMV 110 may be implemented as a motorized or electric kick scooter, bicycle, and/or motor scooter designed to transport one or perhaps two people at once typically on a paved road (collectively, micromobility PMVs), as a typical automobile configured to transport up to 4, 7, or 10 people at once, or according to a variety of different transportation modalities (e.g., transportation mechanisms). PMVs similar to PMV 110 may be owned, managed, and/or serviced primarily by a fleet manager/servicer providing PMV 110 for rental and use by the public as one or more types of transportation modalities offered by a dynamic transportation matching system, for example. In some embodiments, PMVs similar to PMV 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of PMV 110.

As shown in FIG. 1, PMV 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of PMV 110 may be substantially manual, autonomous, and/or partially or completely controlled by user device 130, which may include one or more of a user interface 132, a wireless communications module 134, a camera 138, and other modules 136. In other embodiments, PMV 110 may include any one or more of the elements of user device 130. In some embodiments, one or more of the elements of system 100 may be implemented in a combined housing or structure that can be coupled to or within PMV 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of PMV 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of PMV 110, for example, or distributed as multiple logic devices within PMV 110 and/or user device 130.

In some embodiments, controller 112 may be configured to substantially continuously monitor and/or store the status of and/or sensor data provided by one or more elements of PMV 110 and/or user device 130, such as the position and/or orientation of PMV 110 and/or user device 130, for example, and the status of a communication link established between PMV 110 and/or user device 130. Such communication links may be established and then provide for transmission of data between elements of system 100 substantially continuously throughout operation of system 100, where such data includes various types of sensor data, control parameters, and/or other data.

User interface 113 of PMV 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of PMV 110 and/or other elements of system 100. For example, user interface 113 may be adapted to display a time series of positions, headings, and/or orientations of PMV 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause PMV 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of PMV 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of PMV 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of PMV 110 (e.g., or an element of PMV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to PMV 110 and to monitor the status of a communication link directly or indirectly established between PMV 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to PMV 110 and/or to steer PMV 110. In some embodiments, propulsion system 122 may include elements that can be controlled (e.g., by controller 112 and/or user interface 113) to provide motion for PMV 110 and to provide an orientation for PMV 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility PMVs), PMV 110 may include battery 124. Battery 124 may be implemented by one or more battery cells (e.g., lithium ion battery cells) and be configured to provide electrical power to propulsion system 122 to propel PMV 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of PMV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of PMV 110 and/or system 100. In further embodiments, other modules 126 may include a light, such as a headlight or indicator light, and/or an audible alarm, both of which may be activated to alert passersby to possible theft, abandonment, and/or other critical statuses of PMV 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about PMV 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility PMV, as described herein.

PMVs implemented as micromobility PMVs may include a variety of additional features designed to facilitate fleet management and rider and environmental safety. For example, as shown in FIG. 1, PMV 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of PMV 110 and/or other elements of system 100. For example, user interface 132 may be adapted to display a time series of positions, headings, and/or orientations of PMV 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause PMV 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or PMV 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of PMV 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for PMV 110, using one or more power leads. Such power leads may also be used to support one or more communication techniques between elements of system 100.

Figure 2:
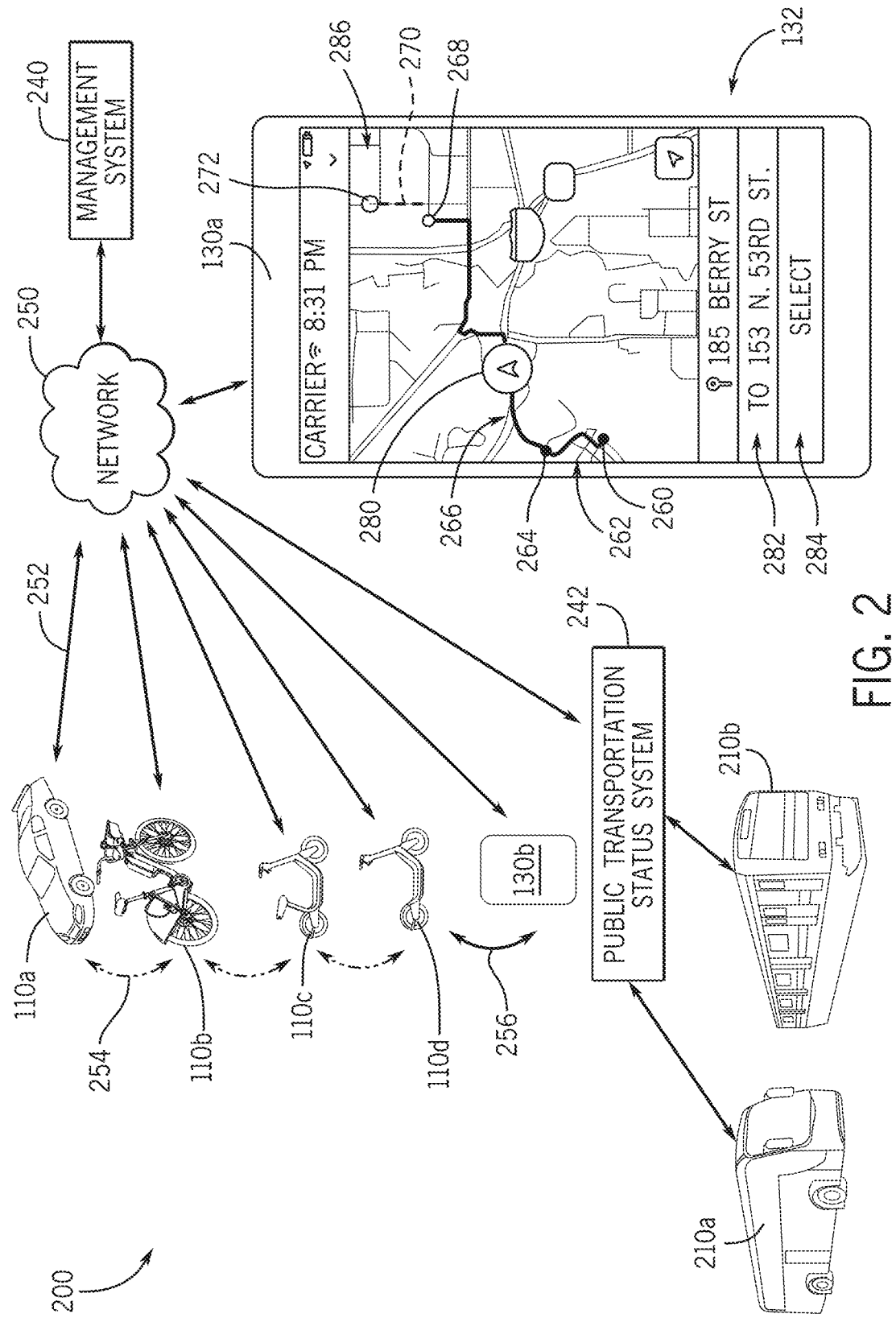
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of PMVs 110*a-d* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all PMVs are able to communicate directly to WAN 250 and, in some embodiments, may be able to communicate across mesh network communication links 254, to convey fleet data and/or fleet status data amongst themselves and/or to and from management system 240.

In FIG. 2, user device 130*a* may receive an input with a request for transportation with one or more PMVs 110*a-d* and/or public transportation vehicles 210*a-b*. For example, the transportation request may be a request to use (e.g., hire or rent) one of PMVs 110*a-d*. The transportation request may be transmitted to management system 240 over WAN 250, allowing management system 240 to poll status of PMVs 110*a-d* and to select one of PMVs 110*a-d* to fulfill the transportation request. Upon or after one of the PMVs 110*a-d* is selected to fulfill the transportation request, a fulfillment notice from management system 240 and/or from the selected PMV 110a-d may be transmitted to the user device 130a. In some embodiments, navigation instructions to proceed to or otherwise meet with the selected PMV 110a-d may be sent to the user device 130a. A similar process may occur using user device 130b, but where the transportation request enables a PMV over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of PMVs 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among PMVs 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including PMVs and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of PMVs 210a or 210b), and a micromobility route 270 (e.g., using one or more of micromobility PMVs 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility PMV to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share PMV, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
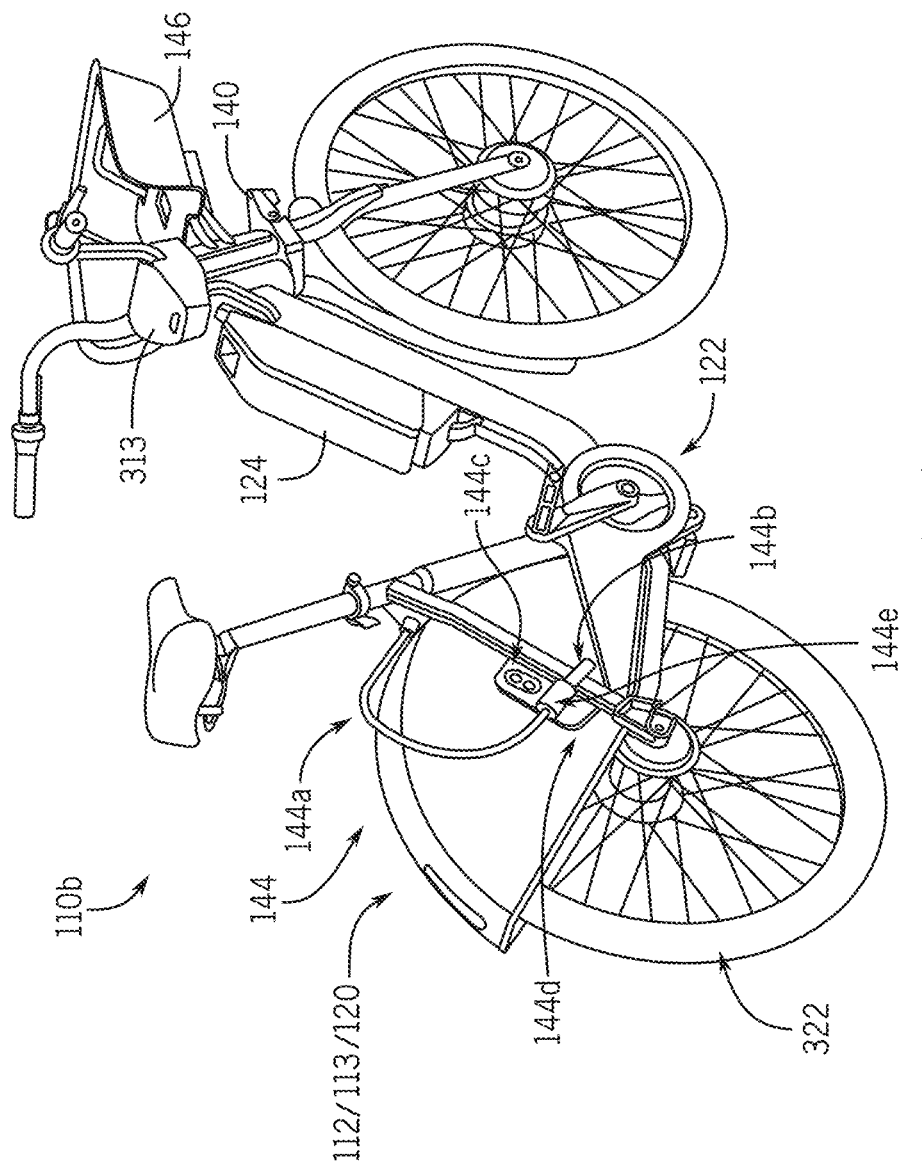
FIGS. 3A-3C illustrate respective diagrams of micromobility PMVs for use in a dynamic transportation matching system in accordance with an embodiment of the disclosure.
Figure 3B:
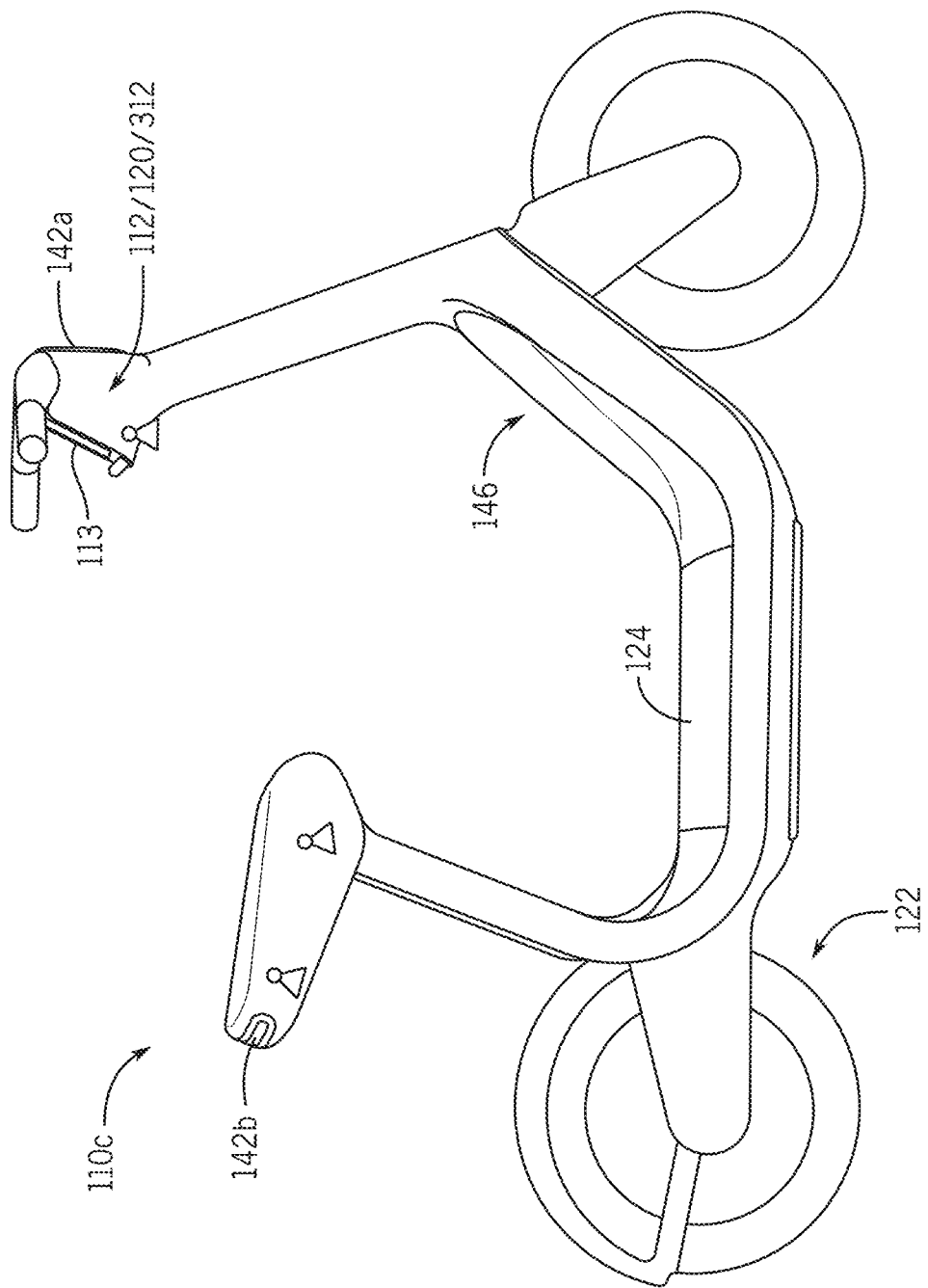
Figure 3C:
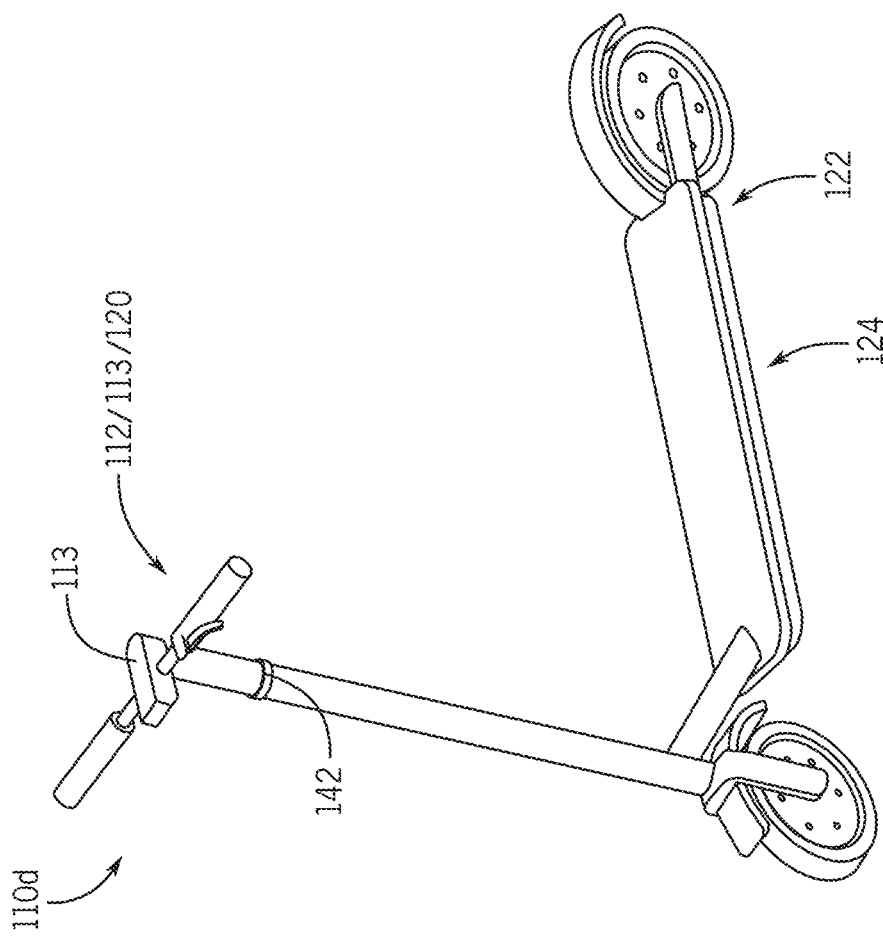

FIGS. 3A, 3B, and 3C illustrate respective diagrams of micromobility PMVs 110b, 110c, and 110d, which may be integrated network systems in accordance with an embodiment of the disclosure. For example, PMV 110b of FIG. 3A may correspond to a motorized bicycle integrated with the various elements of system 100 and may be configured to participate in dynamic transportation matching system 200 of FIG. 2. As shown, PMV 110b includes controller/user interface/wireless communications module 112/113/120 (e.g., integrated with a rear fender of PMV 110b), propulsion system 122 configured to provide motive power to at least one of the wheels (e.g., a rear wheel 322) of PMV 110b, battery 124 for powering propulsion system 122 and/or other elements of PMV 110b, docking mechanism 140 (e.g., a spade lock assembly) for docking PMV 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of PMV 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize PMV 110b by default, thereby requiring a transportation requester or rider to transmit a request to management system 240 (e.g., via user device 130) to reserve PMV 110b before attempting to use PMV 110b. The request may identify PMV 110b based on an identifier (e.g., a QR code, a barcode, a serial number, etc.) presented on PMV 110b (e.g., such as by user interface 113 on a rear fender of PMV 110b). Once the request is approved, management system 240 may transmit an unlock signal to PMV 110b (e.g., via network 250). Upon receiving the unlock signal, PMV 110b (e.g., controller 112 of PMV 110b) may release vehicle security device 144 and unlock rear wheel 322 of PMV 110b.

PMV 110c of FIG. 3B may correspond to a motorized sit-scooter integrated with the various elements of system 100 and may be configured to participate in dynamic transportation matching system 200 of FIG. 2. As shown in FIG. 3B, PMV 110c includes many of the same elements as those discussed with respect to PMV 110b of FIG. 3A. For example, PMV 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

PMV 110d of FIG. 3C may correspond to a motorized stand or kick scooter integrated with the various elements of system 100 and may be configured to participate in dynamic transportation matching system 200 of FIG. 2. As shown in FIG. 3C, PMV 110d includes many of the same elements as those discussed with respect to PMV 110b of FIG. 3A. For example, PMV 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
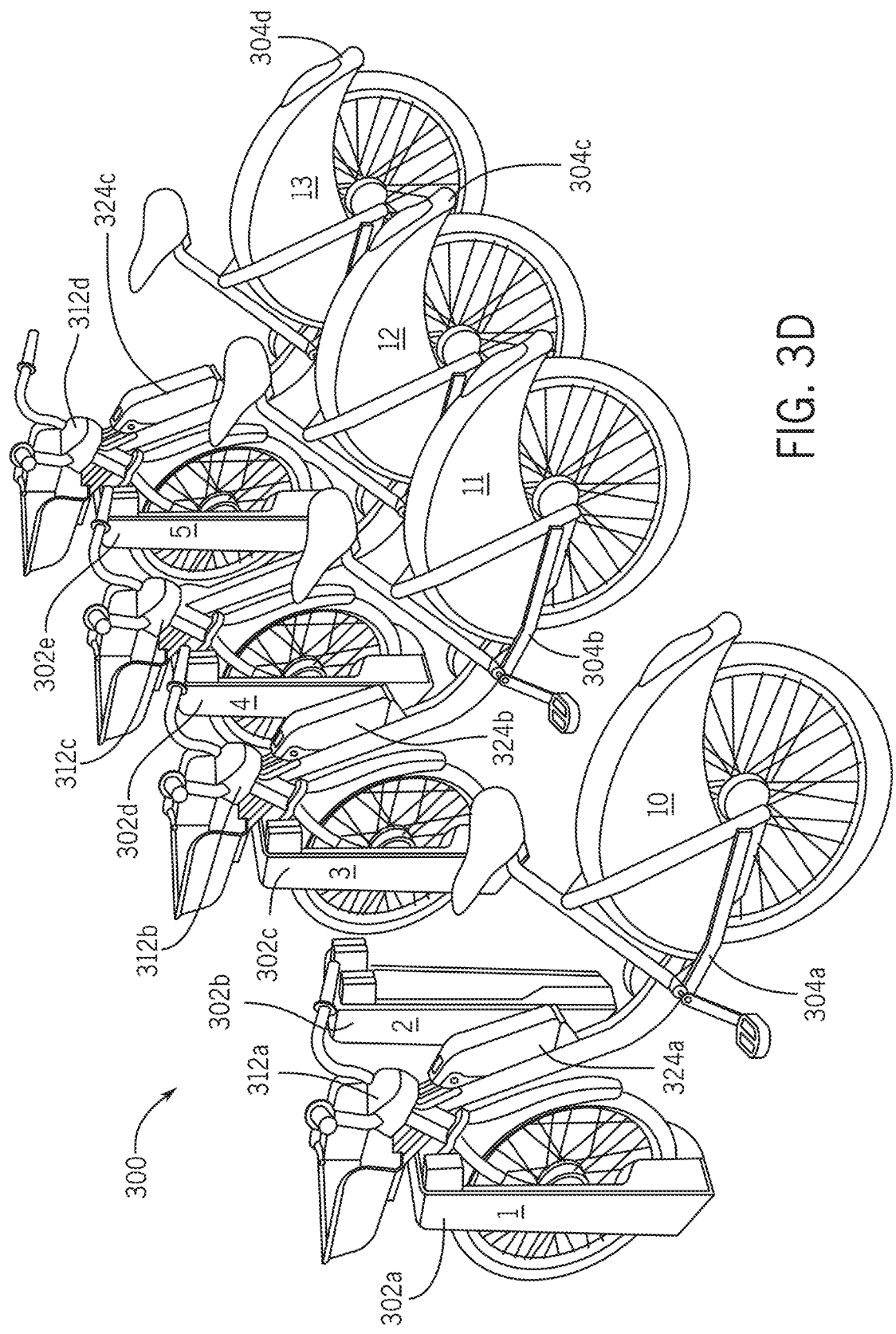
FIG. 3D illustrates a diagram of a docking station for docking one or more micromobility PMVs in accordance with an embodiment of the disclosure.

FIG. 3D illustrates a docking station 300 for docking PMVs (e.g., PMVs 110c, 110e, and 110g, etc.) according to one embodiment. As shown, docking station 300 may include multiple bicycle docks, such as docks 302a-e. In this example, a single PMV (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a PMV is docked in a bicycle dock, the dock may be electronically coupled to the PMV (e.g., controllers 312a-d of the PMV) via a link such that the PMV and the dock may communicate with each other via the link.

A transportation requester or rider may use a user device (e.g., user device 130) to use a micromobility PMV 110b-d that is docked in one of the bicycle docks 302a-e by transmitting a request to management system 240. Once the request is processed, management system 240 may transmit an unlock signal to a micromobility PMV 110b-d docked in the dock and/or the dock via network 250. The docking station 300 may automatically unlock the lock mechanism to release the micromobility PMV 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of PMVs docked at the docking station 300, charge statuses of the docked PMVs, etc.) to the management system 240.

Figure 4:
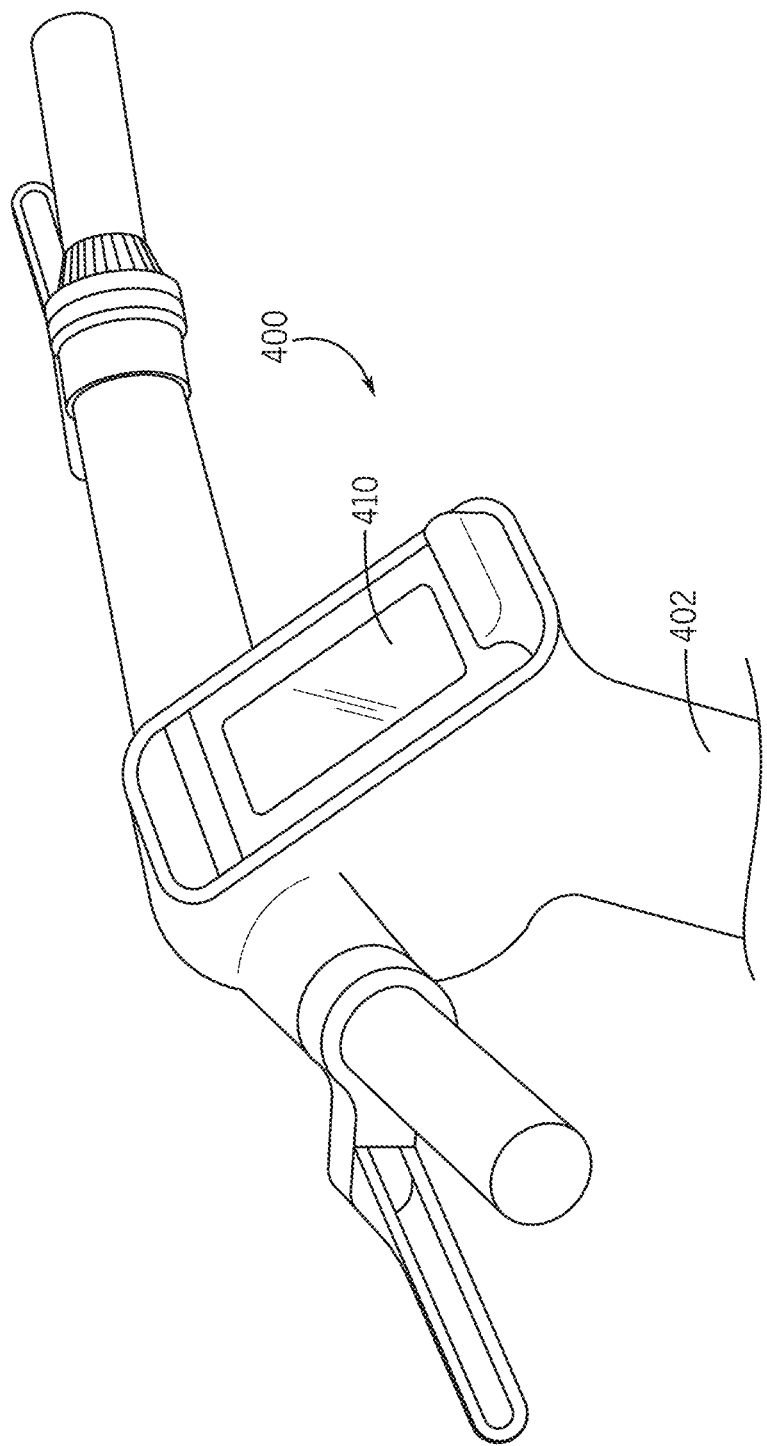
FIG. 4 illustrates a diagram of a user interface associated with a micromobility PMV in accordance with an embodiment of the disclosure.

FIG. 4 illustrates a diagram of a user interface 400 associated with a micromobility PMV 402 in accordance with an embodiment of the disclosure. The micromobility PMV 402 may be similar to any one of PMVs 110b, 110c, or 110d, described above. The user interface 400 may be integrated with the micromobility PMV 402, such as integrated with at least a portion of a cockpit of the micromobility PMV 402. In some embodiments, the user interface 400 may form at least a portion of an outer housing of the handlebar of the micromobility PMV 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility PMV 402 may be rendered on the display 410. Information related to the operation of the micromobility PMV 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility PMV 402. In some embodiments, the user interface 400 may present information similar to that described in U.S. patent application Ser. No. 16/578,995, entitled "Micromobility Electric Vehicle with Electronic Device Holder and Integrated Display," which is incorporated herein in its entirety for all purposes.

Figure 5A:
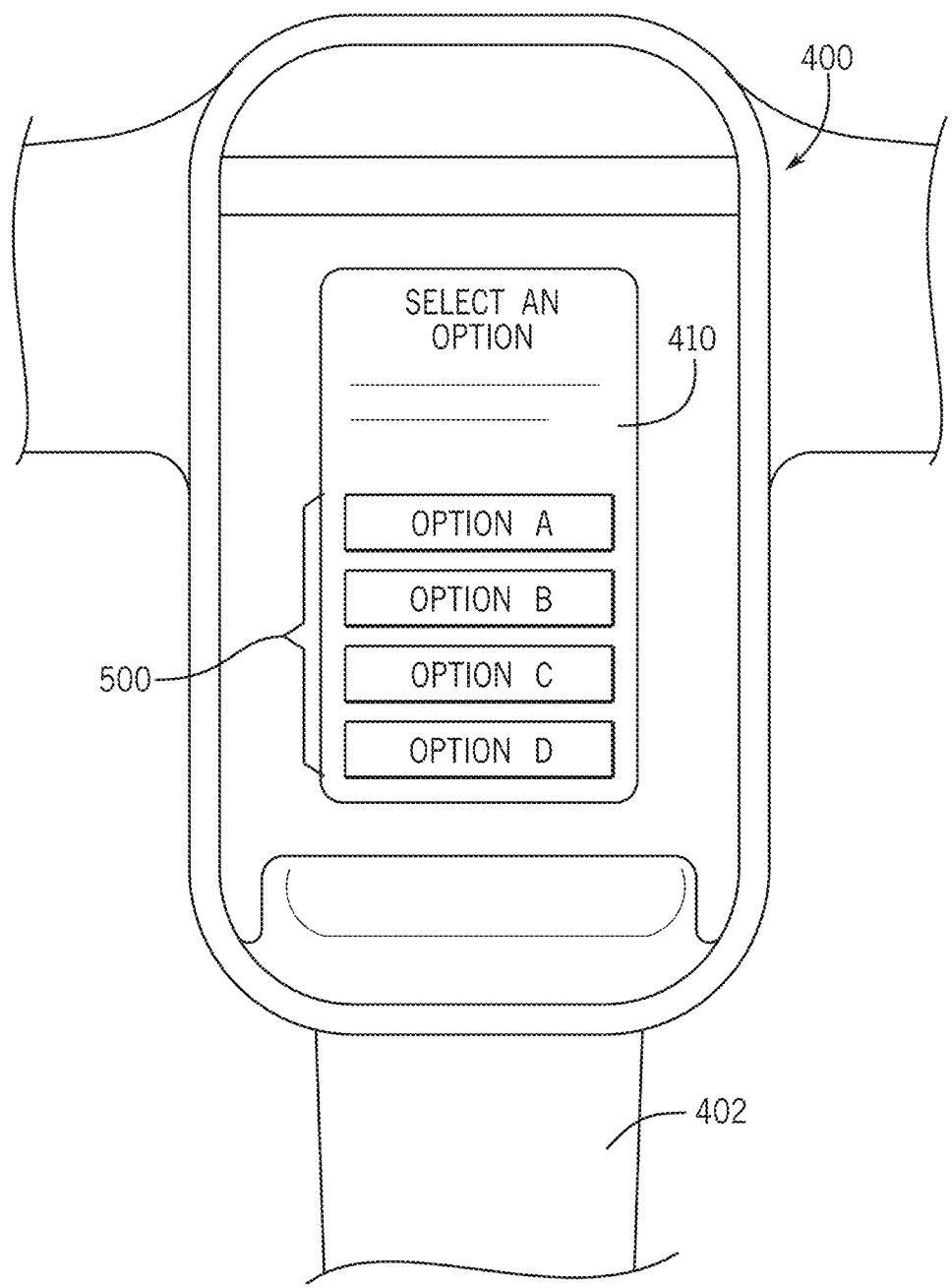
FIGS. 5A-5C illustrate respective diagrams of various examples of information rendered on a display of the user interface of FIG. 4 in accordance with an embodiment of the disclosure.
Figure 5B:
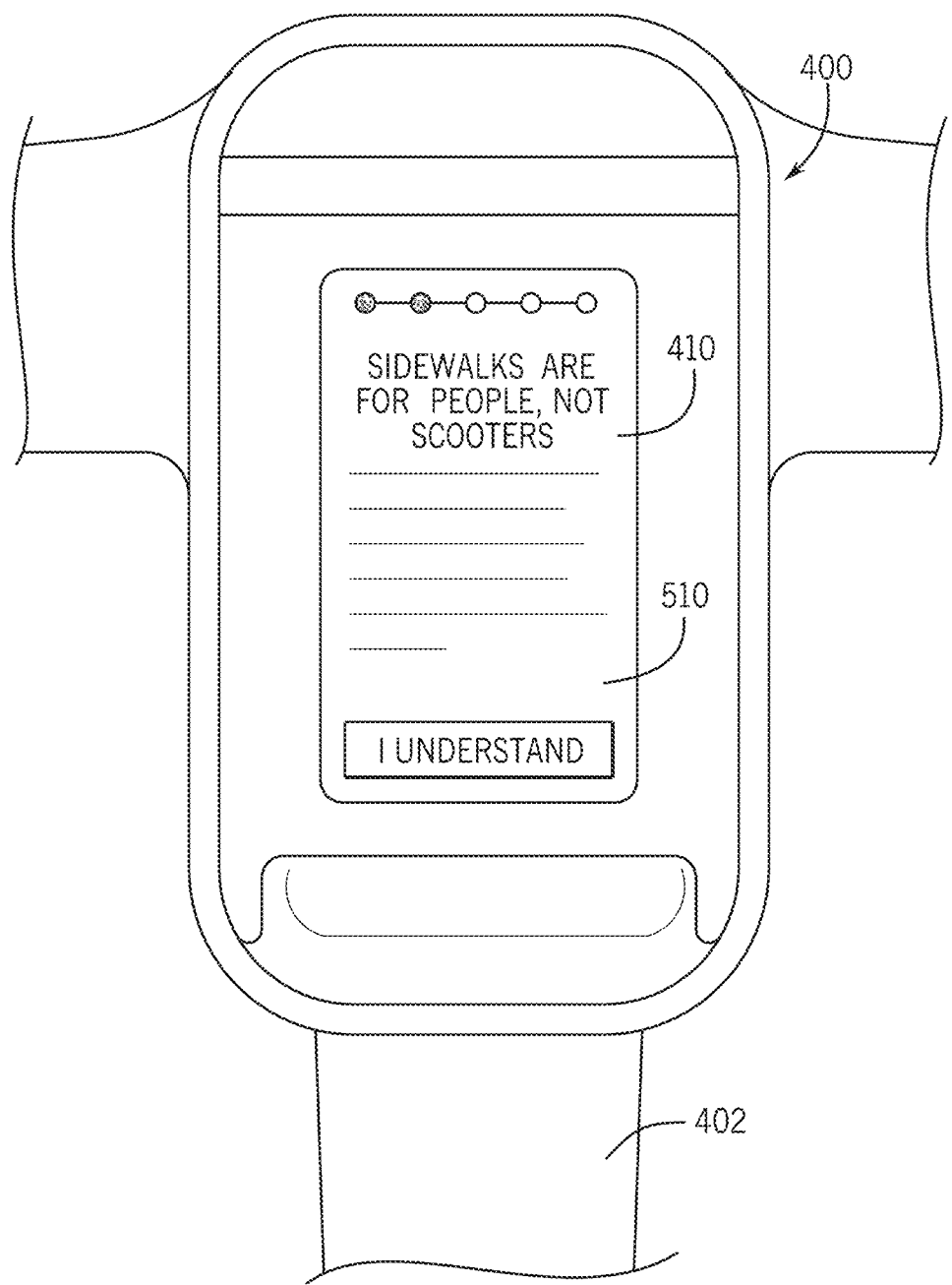
Figure 5C:
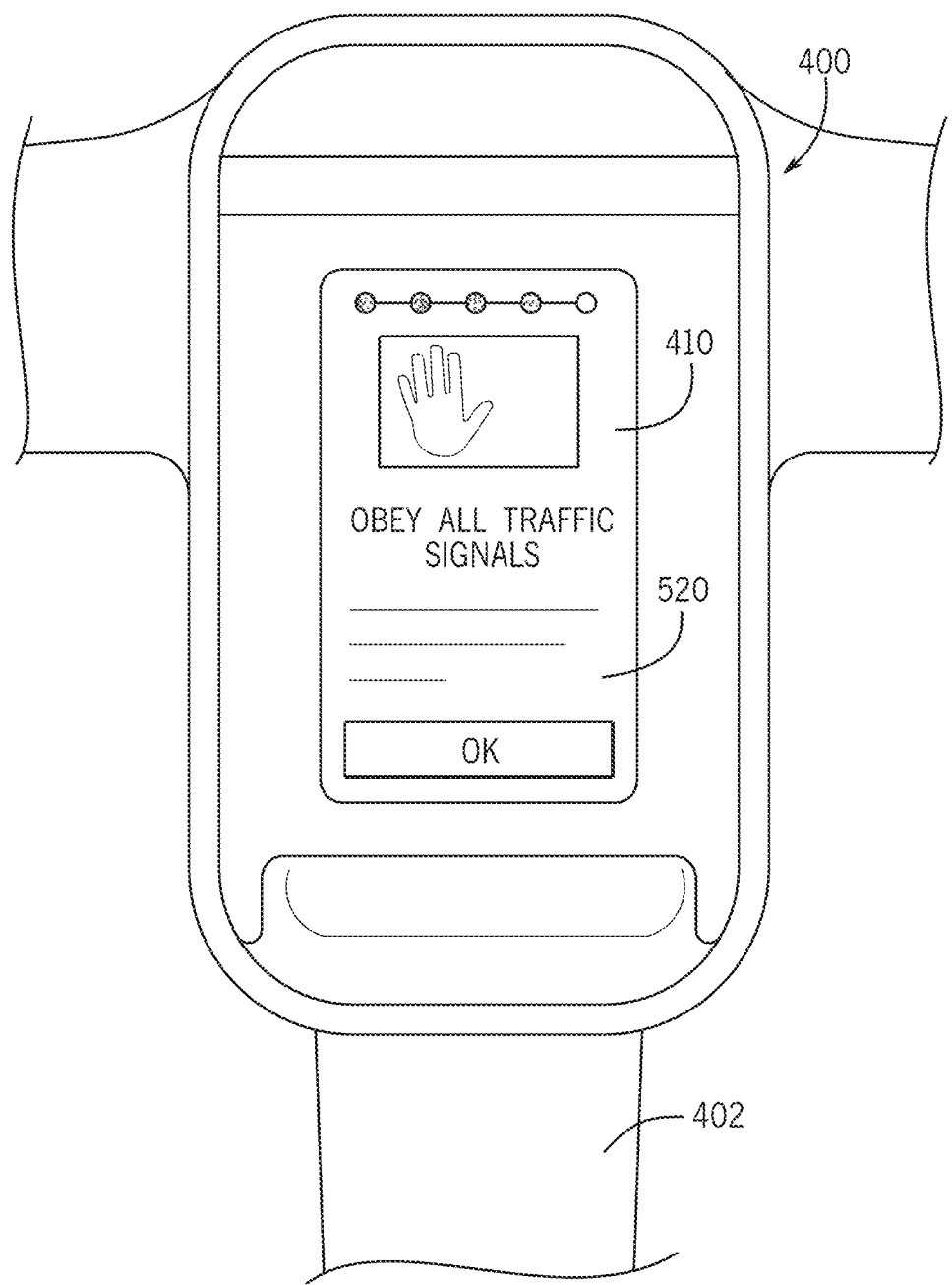

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility PMV 402, which includes starting, during, or ending a trip or prior to starting use or after ending a ride of the micromobility PMV 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility PMV 402 from a docking station, pair the micromobility PMV 402 to a docking station, request service or maintenance of the micromobility PMV 402, report issues with the micromobility PMV 402, and the like. In some embodiments, the options 500 rendered on the display 410 may allow the rider to turn on a headlight assembly, turn off the headlight assembly, or otherwise control operation of one or more systems of the micromobility PMV 402.

Referring to FIG. 5B, the display 410 may render one or more notifications 510 related to operation of the micromobility PMV 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility PMV 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility PMV 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility PMV 402 is detected as being stationary or stopped.

Figure 6:
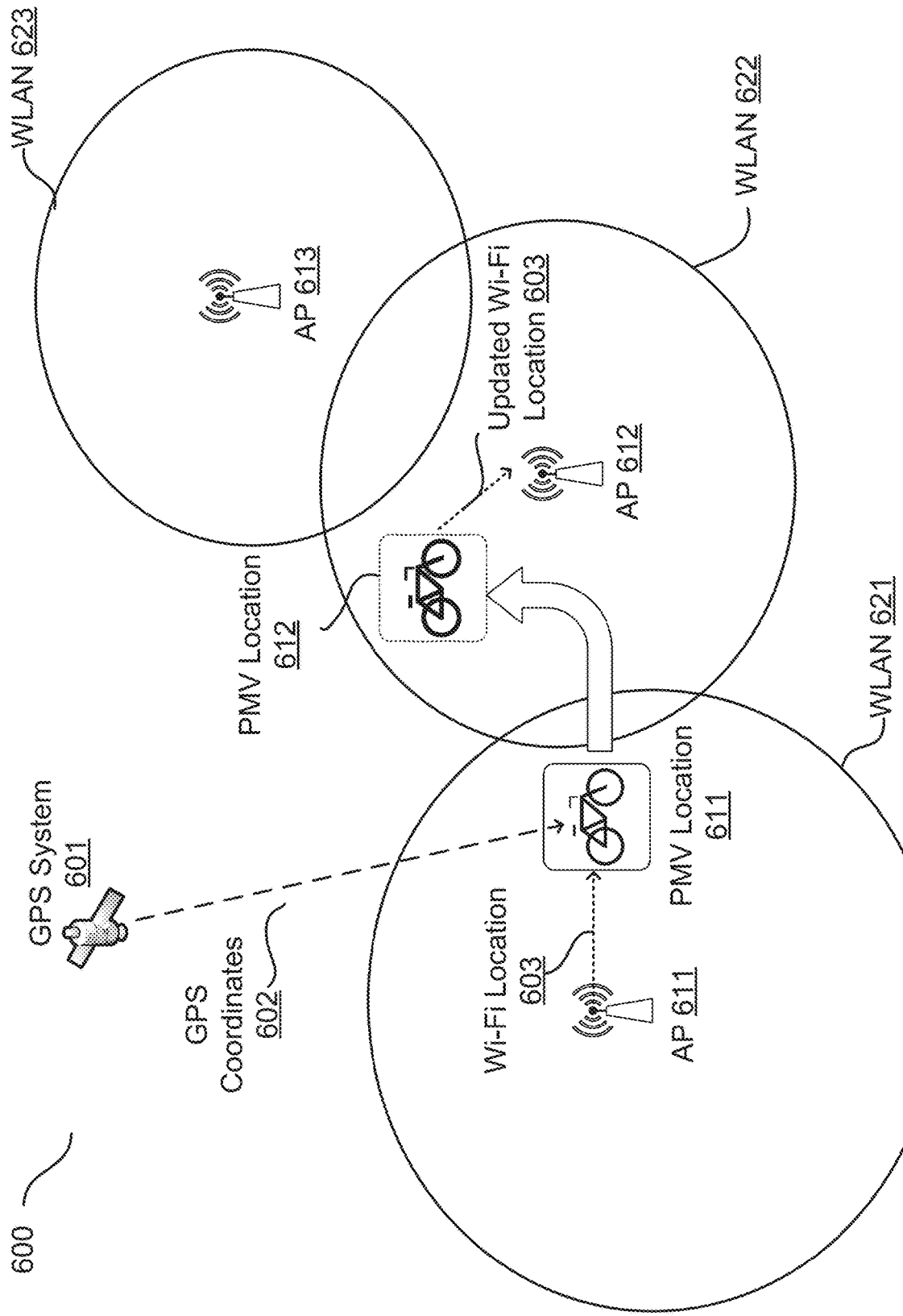
FIG. 6 provides an example block diagram illustrating a PMV localization scenario with unstable GPS reception, according to embodiments described herein.

FIG. 6 provides an example block diagram 600 illustrating a PMV localization scenario with unstable GPS reception, according to embodiments described herein. Diagram 600 shows a geographical area in which a PMV may roam around, e.g., from location 631 to location 632. Traditionally, the location of the PMV may be tracked by the GPS coordinates 602 of the PMV. For example, as the PMV travels around, a GPS component installed on the PMV may provide GPS coordinates 602 to a GPS system 601, which may in turn send the GPS coordinates 602 to the fleet management server. The GPS coordinates 602 may be provided to the server periodically, intermittently or on demand, to provide the most up-to-date location of the PMV. However, as GPS reception may not be stable or constantly available, e.g., when the GPS component on the PMV is broken or out of battery, the PMV may no longer update GPS coordinates 602 with the GPS system 601. As another example, the GPS coordinates 602 may be inaccurate when the PMV is located in an urban canyon environment where GPS signals may be blocked by high buildings. Thus, when the PMV has migrated from location 631 to location 632, the fleet management server may fail to capture the changed location of the PMV, because the last logged location of the PMV is still with location 631.

Embodiments describe here provide various additional location signals to be blended with GPS data of the PMV for the server to derive the current location of the PMV. For example, the geographical area may be covered by several wireless local area network (WLAN) cells 621, 622 and 623, each centered at the respective access point (AP) 611, 612 and 613. When the PMV is connected to a WLAN 621, the respective AP 611 may obtain WiFi location data 603 of the PMV, e.g., AP scan data, IP address of the PMV, and/or the like, which indicates the location of the PMV within the respective WLAN cell 621. In another implementation, the PMV may not need to be connected to the WLAN 621 or 622 when the PMV is physically present within the coverage of the WLAN cells. Instead, the PMG may perform passive WiFi scanning and detect publicly broadcasted medium access control (MAC) addresses from WiFi access points 611 or 612 without establishing any connection to the Aps. In this way, the PMVs can stay invisible to the WiFi APs, thus protecting the privacy of the rider.

Therefore, when the PMV migrates from location 631 to location 632, i.e., in turn from geographical coverage under WLAN cell 621 to WLAN cell 622, the PMV may obtain updated WiFi location data 603 of the PMV, e.g., the MAC address from the AP 612 via passive WiFi scanning, even if GPS signals may not be available at location 632 for the PMV. In this way, the fleet management server may receive the updated Wi-Fi location data 603, and determine the current location of the PMV based on blended information of the logged GPS location and the updated WiFi location.

Additional information that may be blended with GPS data and/or WiFi location data described in FIG. 6 for the server to derive the current location of the PMV may include user scan location (e.g., when a user operates a user device to unlock or lock a PMV indicating that the PMV is currently at a docking station), user reported issue location, user reported ride rating, fieldwork scan location (e.g., a location provided by maintenance personnel), Bluetooth ping location (e.g., by rideshare vehicles with Bluetooth enabled scanners), and/or the like. According to some embodiments, the PMV may including components capable of blending the GPS data, WiFi location data, and/or other location data or motion data, as will be described herein. According to some embodiments, the fleet management server may be capable of blending the GPS data, WiFi location data, and/or other location data or motion data, as will be described herein.

Figure 7A:
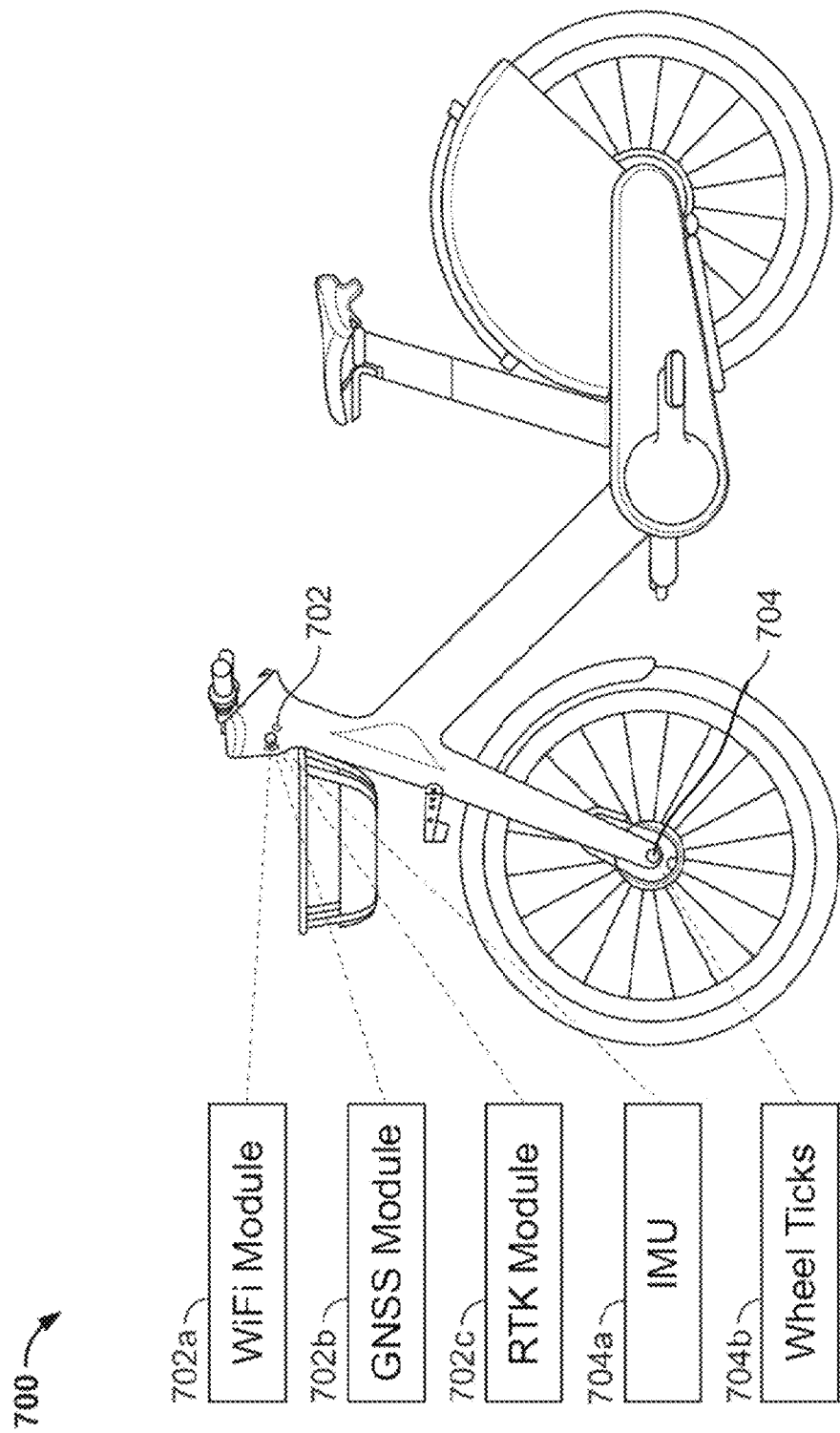
FIGS. 7A-7B provide diagrams illustrating example hardware configuration of modules on the PMV for enhanced localization, according to embodiments described herein.

FIG. 7A provides a diagram illustrating an example hardware configuration of the PMV for enhanced localization, according to embodiments described herein. The PMV 700 may be any of the personal vehicles shown in FIGS. 3A-3C. Specifically, PMV 700 may include a hardware network component 702, which may be installed at the center of the handlebar of the PMV. The network component 702 may include a WiFi module 702a, which may connect to a WLAN when the PMV enters the geographical area covered by the WLAN, and in turn provide WiFi location data of the PMV 700. Alternatively, the WiFi module 702a may perform passive WiFi scanning and receive a broadcasted MAC address from an AP when the PMV is present within the coverage of the AP. Such MAC address of the AP may be indicative of the location of the PMV. The network component 702 may further include a global navigation satellite system (GNSS) module 702b and optionally a real-time kinematics (RTK) module 702c. The GNSS module 702b and the RTK module 702c combined may generate RTK corrected GNSS data of the PMV 700.

In one embodiment, the PMV 700 may be configured with a plurality of motion sensors. For example, an inertial measurement unit (IMU) 704a may be installed at the PMV, e.g., at the center of the handlebar, which detects the movement of the PMV 700, such as the velocity, acceleration, direction, and/or the like. For another example, a wheel tick counter 704b may be installed at the center 704 of the front (or back) wheel of the PMV 700. The wheel tick counter 704b may record a count of the wheel ticks, which may be used to supplement movement data of the PMV 700. According to some embodiments, the motion data of the PMV 700 may be transmitted concurrently and/or sequential with the location data of the PMV 700 to the fleet management server. In some examples, the motion data and location data may be blended when transmitted to the fleet management server.

Figure 7B:
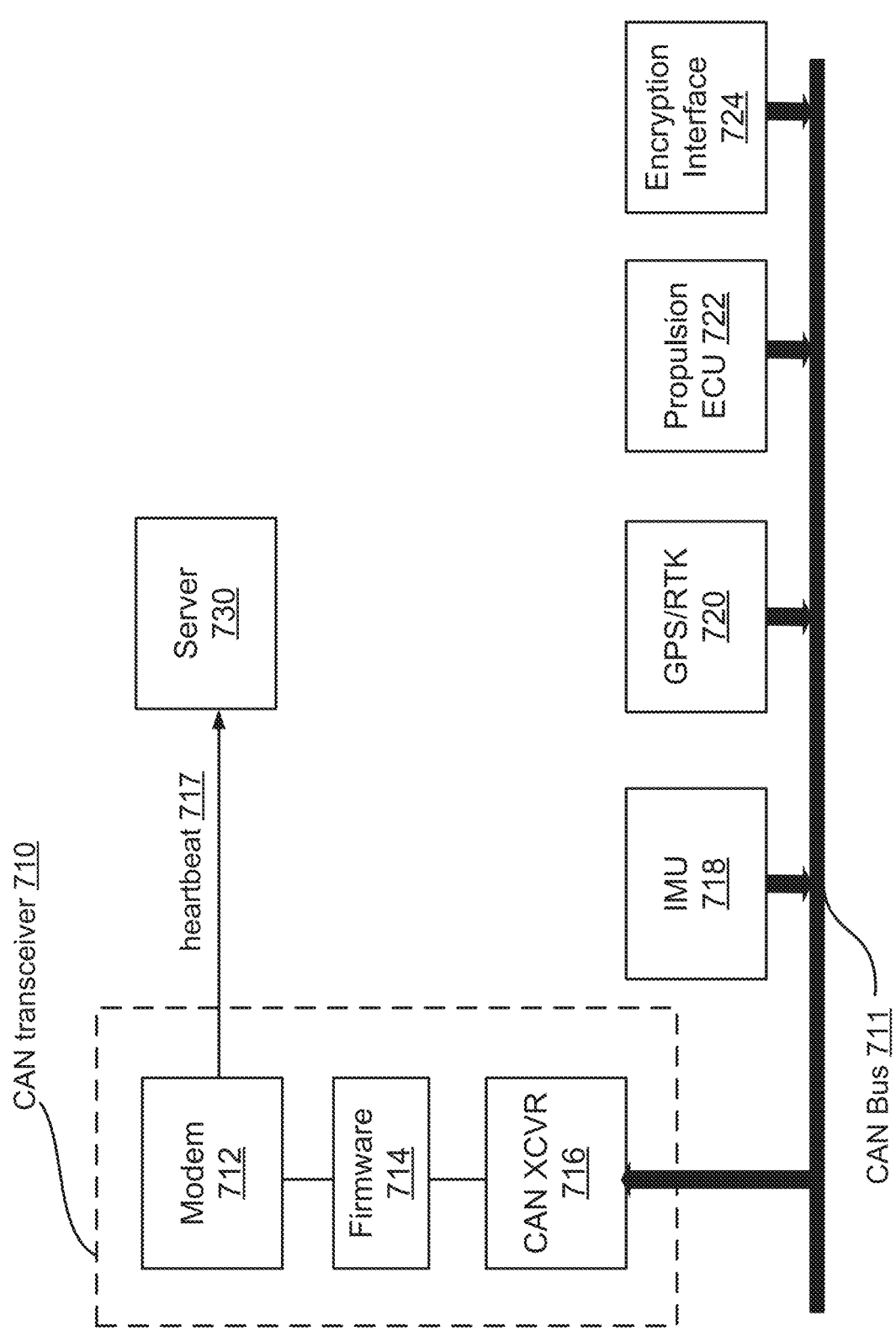

FIG. 7B provides a diagram illustrating an example hardware configuration of modules connected by a controlled area network (CAN) bus on the PMV for enhanced localization, according to embodiments described herein. As shown in FIG. 7B, a CAN bus 711 may connect different modules and/or sensors on the PMV. For example, the IMU 718 (similar to 704a in FIG. 7A), GPS/RTK module 720 (similar to 702b-c in FIG. 7A), a propulsion engine control unit (ECU) 722, a CAN transceiver 710, an encryption interface 724, and/or other sensors or modules may be connected by the CAN bus. In one embodiment, a single CAN bus 711 may be used to connect physical or virtual nodes associated with sensors and/or modules around the PMV. In this way, each sensor and/or module is in communication with the CAN bus 711, and the CAN bus 711 can monitor the signals or data being transmitted.

Conventionally, CAN bus may not be secure platforms. However, the single CAN bus 711 may be secured by way of communication with an encryption interface component 724 capable of storing and generating cryptographic keys that may be used by the CAN bus 711 to encrypt internal messages transmitted and/or received by the CAN bus 711 and to authenticate external peripheral devices that may be connected to the PMV. For example, when an external peripheral device is connected to the PMV, the CAN bus 711 may validate external messages received from the external peripheral device based upon whether the external messages are generated using the same cryptographic key. The cryptographic key may be stored and/or generated by the encryption interface component 724. Other examples of encryption techniques may be implemented including symmetric and asymmetric encryption, hashing, encryption protocols, logic signal voltage levels, and the like. As the PMV may be connected to external peripheral devices, it may be beneficial to restrict access from untrusted external peripheral devices to sensitive data signals transmitted by and/or received by the CAN bus 711.

In one embodiment, modules and/or sensors 718, 720, 722, 724 and/or the like may transmit raw data to the CAN bus 711, such as raw GPS data, raw IMU data, and/or the like. The CAN bus 711 is also connected to ECUs 722 of the PMV to collect engine control data. For example, the propulsion ECU 722 may be a PowerTrain microcontroller (MCU).

In one embodiment, the CAN bus 711 transmits the signals from the sensors and/or modules to the CAN transceiver 710. The CAN transceiver 710 includes a CAN XCVR interface 716, firmware 714 and a modem 712. The CAN XCVR interface 716 receives the raw data from the CAN bus 711, and packs the raw data into data packets for forwarding to the firmware 714. The firmware 714 then preprocesses the data packets to generate data packets for transmission. For example, the firmware 714 may compress the data signals by taking an average of data signals over a period of time (e.g., 10 seconds, etc.), depending on the type of the data, and incorporate the average value of the signal into the data for transmission. In this way, the pre-processing reduces bandwidth and costs associated with reviewing data.

The modem 712 receives the data for transmission from the firmware 714, and packs the data into a heartbeat signal 717 via data aggregation. The heartbeat signal 717 is then sent to the server 730 (which is similar to server 810 as further described in relation to FIG. 8). In some examples, the heartbeat signal 717 may include at least one of longitude coordinates or latitude coordinates.

Figure 8:
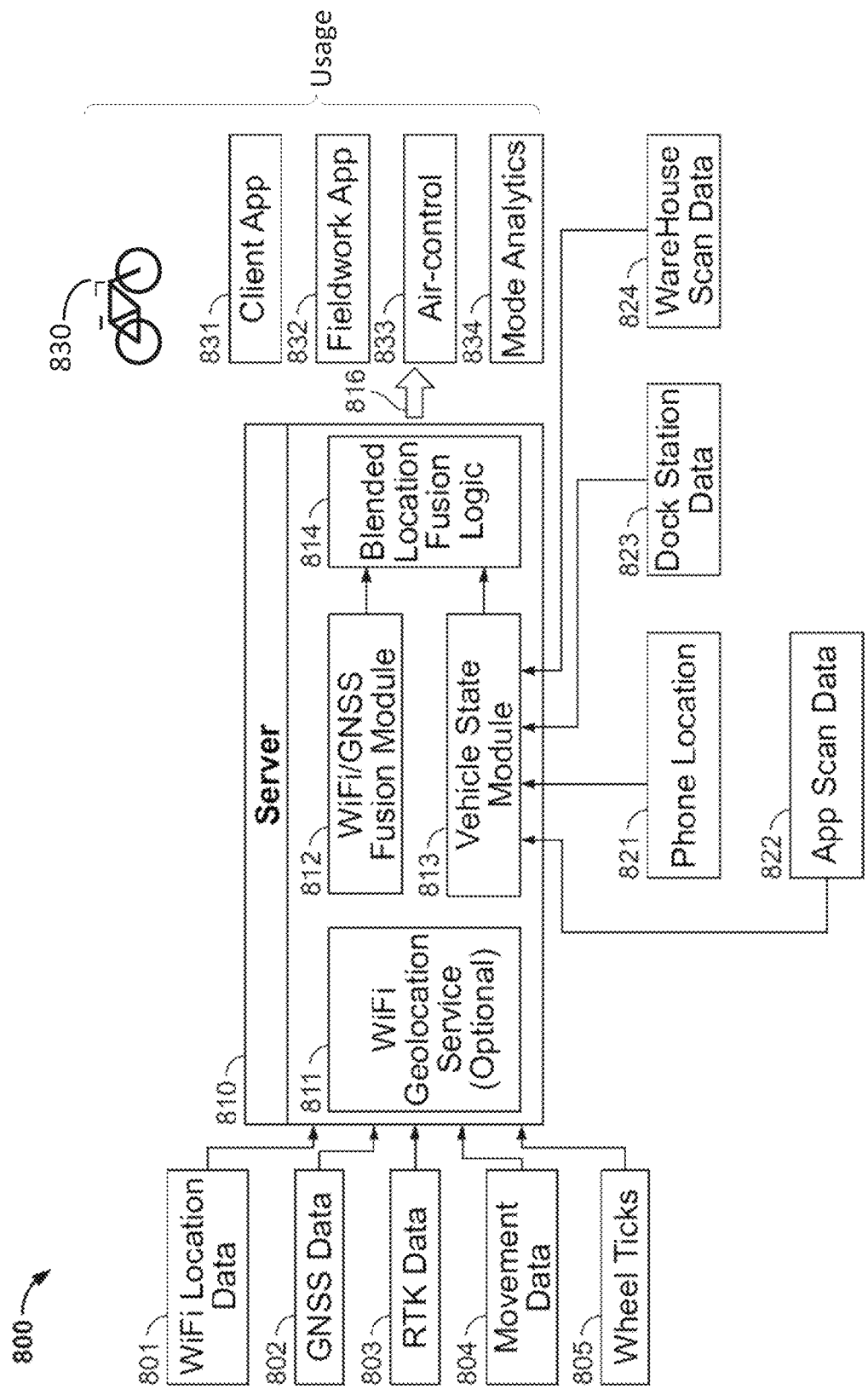
FIG. 8 provides a block diagram illustrating example data flow between a PMV and a server for PMV localization based on blended data inputs, according to embodiments described herein.

FIG. 8 provides a block diagram 800 illustrating example data flow between a PMV and a server for PMV localization based on blended data inputs, according to embodiments described herein. Diagram 800 shows a server 810 (e.g., the server of a fleet management system) receiving various data relating to the location of a PMV from different sources.

In one embodiment, the server 810 may receive WiFi location data 801, GNSS data 802, (optional) RTK data 803 that provide corrected GNSS data, movement data 804 and wheel tick data 805 captured by the PMV. The various types of data 801-805 may be combined at the PMV into one or more blended data signals for transmission to the server 810, as further described in FIG. 9. For example, a WiFi geolocation service module 811 at the server 810 may determine estimated location of the PMV based on the WiFi location data 801.

For another example, the WiFi/GNSS fusion module 812 may blend the WiFi location data 801, the GNSS data 802 and/or the RTK data 803 via a machine learning model to generate an estimated location of the PMV. The machine learning model is pre-trained by a training dataset of location data artifacts, each location artifact includes a GNSS location of the PMV, a Wi-Fi location of the PMV, and a ground-truth location of the PMV. The machine learning model may then predict a location of the PMV based on an input of the GNSS location and the Wi-Fi location, and then compare the predicted location with the ground-truth location of the PMV to compute a training loss. The training loss is minimized to update the machine learning model via backpropagation.

In one embodiment, the server 810 may receive status data indicating the status of the PMV, e.g., whether the PMV is being docked at a docking station, at a warehouse for maintenance, in use by a rider, and/or the like. For example, the server 810 may receive phone location data 821 and application scan data 822 from a user device that has checked out the PMV from a docking station, docking station data 823 from a docking station indicating that the PMV has been checked into the docking station, warehouse scan data 824 from a warehouse indicating that the PMV is located at a docking station. Thus, the vehicle state module 813 at the server 810 may determine the vehicle status of the PMV, based on received data 821-824. The vehicle status may be one of in a warehouse, in transportation, docked at a docking station, and checked out by a user mobile device. In some embodiments, the vehicle status may be used by the server 810 to supplement the location data and/or motion data to more accurately determine the location of the PMV. In some embodiments, the server 810 may utilize the vehicle status to determine an amount of confidence level to be associated with the location data and/or motion data. For example, if GNSS location data indicates that the PMV is moving through the streets while the vehicle status indicates that the PMV has just been docked at a docking station, then the server 810 may assign a lower confidence level to the GNSS data while assigning a higher confidence level to the data associated with the vehicle status.

The server 810 may further include a blended location fusion logic 814 that is configured to blend the geo-location generated by the WiFi/GNSS fusion module 812 and the vehicle status from the vehicle state module 813. For example, the blended location fusion logic 814 may apply one or more pre-defined priority rules to the generated geolocation indication and the vehicle status to determine a geolocation of the PMV based on an application of the one or more pre-defined priority rules. The priority rules may indicate a confidence level associated with different location indicator, and thus rank and prioritize location data with higher confidence levels based on the vehicle status. For instance, the WiFi/GNSS fusion module 812 may generate a confidence score associated with the predicted geolocation by the underlying machine learning model.

For another instance, the pre-defined priority rule may assign a higher confidence level to vehicle status data received from the docking station (indicating the PMV is located at the docking station) or the warehouse (indicating the PMV is located at the warehouse), because vehicle status data from the docking station or warehouse are considered generally reliable. Meanwhile, a lower confidence level may be assigned to a location that is solely determined by GNSS data as GNSS data can often be unstable.

As another example, the blended location fusion logic 814 may further apply the pre-defined priority rule to dynamically infer confidence levels of different location data based on the vehicle status of the PMV. For example, when the vehicle status data shows the PMV is in land transportation from the warehouse, the blended location fusion logic 814 may assign a higher confidence level to GNSS data, but lower confidence level to WiFi location data, because any WiFi location data of the PMV may be out-of-date as the PMV is likely out of connection to any WLAN during transportation. Or alternatively, if the vehicle status data shows the PMV is in air transportation, the blended location fusion logic 814 may assign a higher confidence level to WiFi location data if the WiFi location data indicates the PMV is connected to an in-flight WiFi, but lower confidence level to GNSS data.

For another instance, the pre-defined priority rules may consider the recency of the data as a factor to determine the confidence level of the location data, e.g., the more recent the location data is, the higher confidence score is assigned to the particular location data. Therefore, in this way, the blended location fusion logic 814 may prioritize or rank various location data factors based on the confidence level which reflects the reliability of the location data.

In one embodiment, the blended location fusion logic 814 may apply a weighted sum of the location determined by the vehicle state, the motion of the vehicle determined by IMU data/dead reckoning data, and the location determined by the WiFi/GNSS data, weighted by respective confidence scores. For instance, the blended location fusion logic 814 may employ a machine learning model to dynamically estimate the weights to blend location data. For another instance, the blended location fusion logic 814 may use the confidence level of location data to determine the weights for each location data factor. The weights may be dynamically adjusted based on the recency, the type, and/or the source of the location data factor, as described with respect to the confidence level.

In one embodiment, the server 801 may send a determined location 816 of the PMV to various target users, e.g., back to the PMV 830 for updating and correcting its own location data, to a client application 831 operating on a user mobile device, to a fieldwork application 832 operated by a field worker, to an air control server 833 for control and predict traffic at a specific location, for mode analytics 834, and/or the like. For example, the PMV may display the returned accurate location on a user interface for the rider when the PMV is in a geofenced region where the mobility of the PMV is limited. For another example, the determined location 816 may serve as a feedback signal to improve the machine learning model at modules 812 and 814. In some examples, the more accurate location of the PMV may be helpful for localizing where the PMV is located on a street (e.g., the specific lane), which may be helpful for the server 801 to provide more specific directions for navigating the user to a location, such as presenting the specific directions on the display 410.

FIG. 9A provides a block diagram illustrating an example work flow of combining various different signals to generate a localization heartbeat signal for the server, according to embodiments described herein. For example, at PMV side, a RTK correction module 902 may combine the GNSS data 802 and the RTK data 803 to generated corrected GNSS data 903.

A reckoning module 904 may combine the movement data 804 and wheel tick data 805 to generate reckoning data 905.

A fusion module 906 at the PMV may combine the corrected GNSS data 903 and the reckoning data 905 to generate a periodic heartbeat signal 908. The determined location signal may have blended different factors such as the GNSS data, movement data, and/or the like. In a further implementation, the fusion module 906 may further blend in factors such as user device location, user device Bluetooth data, and/or the like.

In one embodiment, the fused heartbeat signal 908 may be sent the server 810 separate from the WiFi location data 801.

Figure 9B:
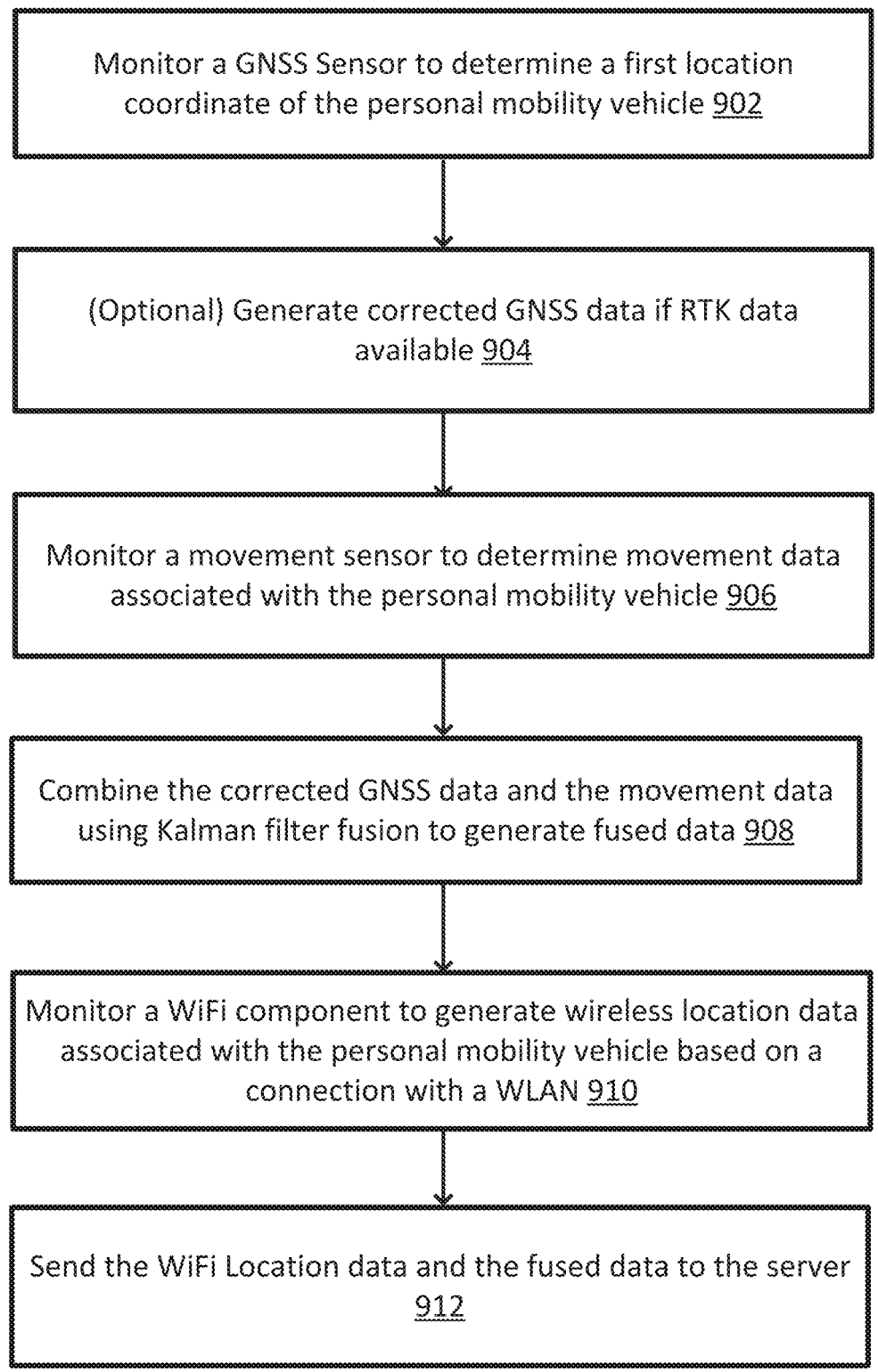
FIG. 9A provides a block diagram illustrating an example work flow of combining various different signals to generate a localization heartbeat signal for the server, and FIG. 9B provides a logic flow diagram illustrating the process of the example work flow in FIG. 9A, according to embodiments described herein.

FIG. 9B provides a logic flow diagram illustrating a process 900 performed on the PMV side to generate fused location data to be transmitted to a server, according to embodiments described herein.

For example, as shown in process 900 in FIG. 9B, at step 912, a processor at the PMV monitors a GNSS sensor to obtain GNSS data 802 and determine a first location coordinate of the PMV. At step 914, corrected GNSS data may be generated if RTK data is available.

At step 916, a processor at the PMV may monitor a movement sensor (e.g., the IMU 704a) and/or wheel tick counter (e.g., 704b) to combine the movement data and/or wheel ticks associated with the PMV.

At step 918, a processor at the PMV may use Kalman filter fusion to combine the corrected GNSS data and movement data to result in a fused data signal indicating a location of the PMV.

At step 920, a processor at the PMV may monitor a WiFi component on the PMV to generate wireless location data (e.g., AP scan data) associated with the PMV based on the connection to the WLAN.

At step 922, the fused data signal (e.g., heartbeat signal 908) and the WiFi location data (e.g., 801) may be sent to the server (e.g., 810).

Figure 10:
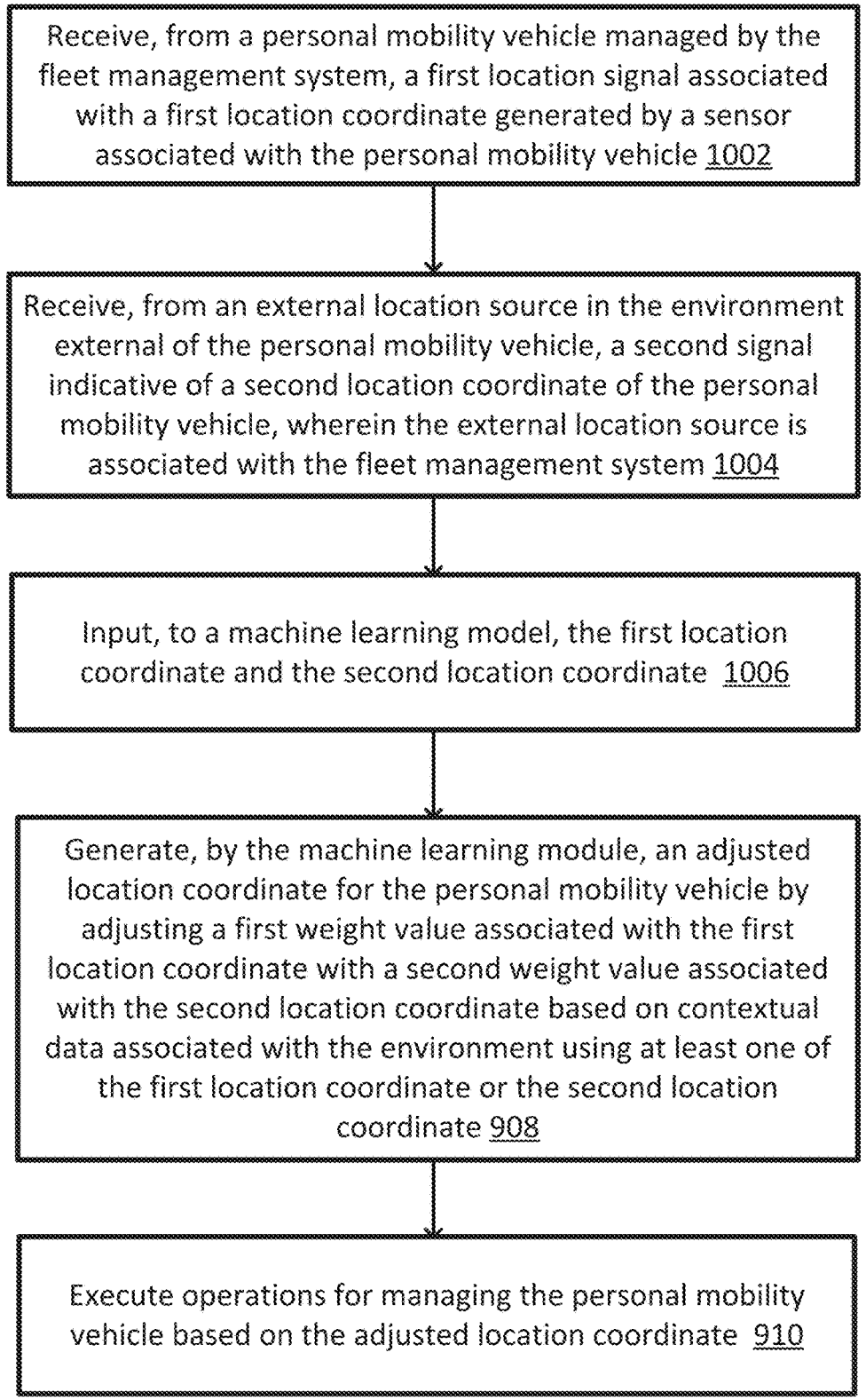
FIG. 10 provides a logic flow diagram illustrating a process of the server receiving bended signals from a PMV to determine a location of the PMV, according to embodiments described herein.

FIG. 10 provides a logic flow diagram illustrating a process 1000 of the server receiving bended signals from a PMV to determine a location of the PMV, according to embodiments described herein. At step 1002, the server (e.g., of a fleet management system) may receive, from the PMV, a first location signal associated with a first location coordinate generated by a sensor on the PMV. For example, the first location signal may be any of a GNSS data signal, RTK data signal, or the blended heartbeat signal 908 shown in FIG. 9A.

At step 1004, the server may receive, from an external location source in the environment external of the PMV, a second signal indicative of a second location coordinate of the personal mobility vehicle. For example, the external location source is associated with the fleet management system, which can be a user operating a user mobile device to check out the PMV, the docking station, the warehouse, and/or the like. The second signal may be any combination of the external data 821-824 described in FIG. 8.

At step 1006, the server may determine an adjusted location coordinate for the personal mobility vehicle by adjusting a first weight value associated with the first location coordinate with a second weight value associated with the second location coordinate based on contextual data associated with the environment using at least one of the first location coordinate or the second location coordinate. For example, the server may engage a machine learning module to blend the first location coordinate and the second location coordinate, as described in relation to module 812 in FIG. 8. For another example, the server may apply blended location fusion logic 814 to the first location coordinate and the second location coordinate, as described in relation to module 814 in FIG. 8. In other examples, the server may also blend the first location coordinate and the second location coordinate without the use of a machine learning module. For example, the server may use rule-based logic for the blending.

At step 1008, the server may execute operations for managing the personal mobility vehicle based on the adjusted location coordinate. For example, the adjusted location coordinate may be sent for different usages to target users 830-834 as described in FIG. 8.

Figure 11:
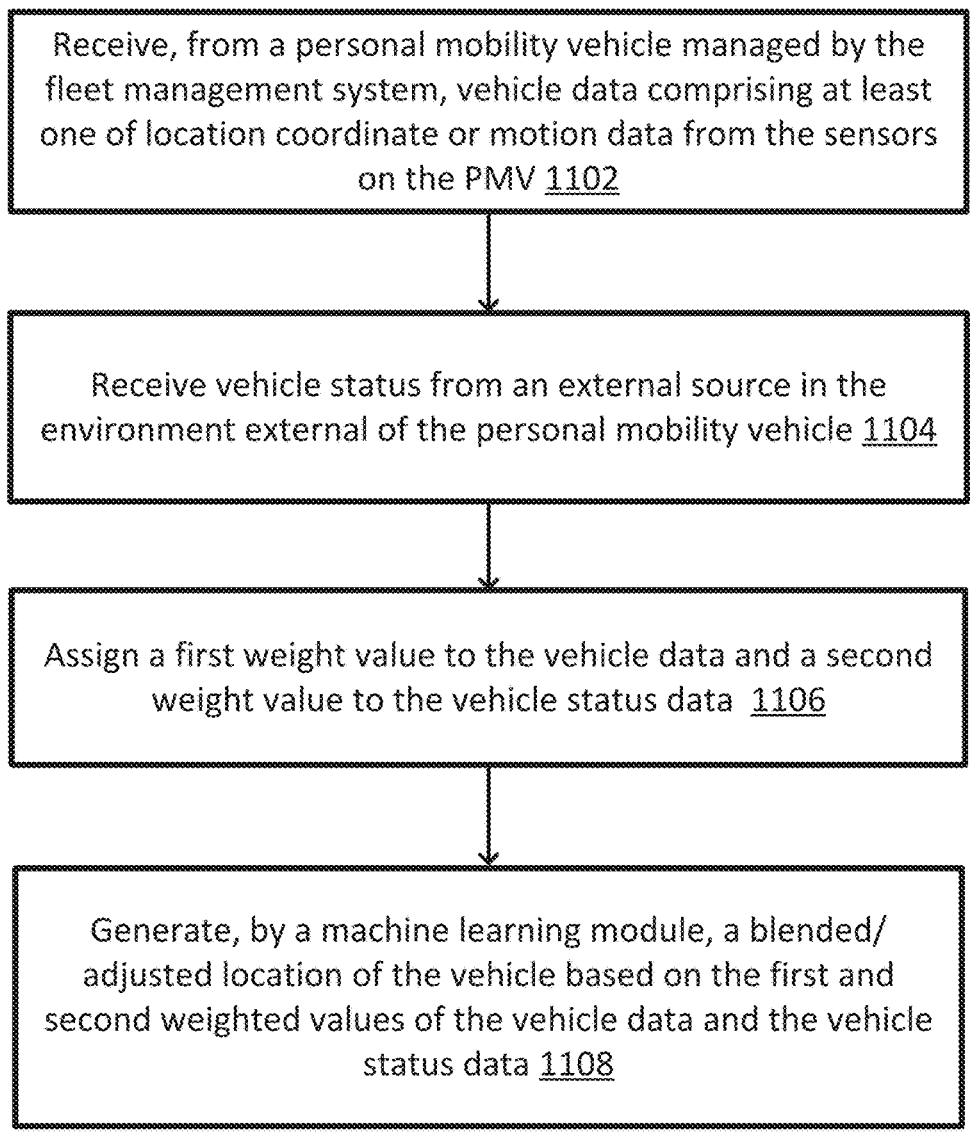
FIG. 11 provides a logic flow diagram illustrating a process 1100 of the server using location fusion logic to blend location data with vehicle status data to determine a more accurate location, according to embodiments described herein.

FIG. 11 provides a logic flow diagram illustrating a process 1100 of the server using location fusion logic to blend location data with vehicle status data to determine a more accurate location, according to embodiments described herein.

At step 1102, the server may receive vehicle data comprising at least one of location coordinate or motion data from the sensors of the PMV. For example, the location coordinate may be the GNSS data 802 and/or the RTK data 803. Motion data may comprise the movement data 804 and/or the wheel ticks 805.

At step 1104, the server may receive vehicle status data from an external source in the environment external of the PMV. For example, the vehicle status data may be received from a dock station (indicating the PMV is docked at the station), from a warehouse (indicating that the PMV is stored at the warehouse), from a fieldworker device (indicating that the PMV has been checked in for transportation), from a rider user device (indicating that the PMV has been checked out from a dock station by a rider), and/or the like.

At step 1106, the server may assign a first weight value to the vehicle data and a second weight value to the vehicle status data. For example, the server may adopt a machine learning system to generate the weight values. The machine learning system may be trained with samples of vehicle data and vehicle status data, and the corresponding ground-truth labels indicating the actual locations of the PMV.

At step 1108, the server may generate by the machine learning system a blended and adjusted location of the vehicle based on the first and the second weighted values of the vehicle data and the vehicle status data.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of determining a location of a personal mobility vehicle, the method comprising, by a fleet management system:
    receiving, by the fleet management system from a personal mobility vehicle managed by the fleet management system, a first location signal associated with a first location coordinate generated by a sensor associated with the personal mobility vehicle;
    receiving, by the fleet management system from an external location source in the environment external of the personal mobility vehicle, a second location signal indicative of a second location coordinate of the personal mobility vehicle, wherein the external location source is configured to communicate with the personal mobility vehicle or the fleet management system;

determining, by the fleet management system, a first estimated location of the personal mobility vehicle by blending the first location signal and the second location signal using one or more machine-learning models;

determining, by the fleet management system, a second estimated location of the personal mobility vehicle based on movement data of the personal mobility vehicle;

determining, by the fleet management system, a first weight value associated with the first estimated location and a second weight value associated with the second estimated location based on confidence scores determined based on at least vehicle status data received from the personal mobility vehicle or a device associated with the personal mobility vehicle;

determining, by the fleet management system, an adjusted location for the personal mobility vehicle based on the first weight value or the second weight value using the one or more machine-learning models; and executing, by the fleet management system, operations for managing the personal mobility vehicle based on the adjusted location.

2. The method of claim 1, wherein the adjusted location is generated by the one or more machine-learning models using the first estimated location and the second estimated location as an input to the one or more machine-learning models.

3. The method of claim 1, wherein the external location source includes any of a user device used to request the personal mobility vehicle, a docketing station operated by the fleet management system and configured to communicate with the personal mobility vehicle or the fleet management system, a warehouse operated by the fleet management system, or a wireless local area network (WLAN) access point, and wherein the first weight value or the second weight value is adjusted based on contextual data associated with the environment.

4. The method of claim 1, wherein the first location signal combines one or more of:
a global navigation satellite system (GNSS) signal,
a real-time kinematics (RTK) positioning signal, or
a movement signal.

5. The method of claim 1, wherein the movement data includes any one of inertial measurement data or wheel ticks of the personal mobility vehicle.

6. The method of claim 1, wherein the second location signal includes any of:
GNSS data from a user device that has been correlated with the personal mobility vehicle;
a first status signal from a docking station that the personal mobility vehicle has been docked at the docking station; and
a second status signal from a warehouse that the personal mobility vehicle is stored at the warehouse.

7. The method of claim 1, further comprising:
receiving Wi-Fi location data from the personal mobility vehicle when the personal mobility vehicle is connected to a wireless local area network (WLAN).

8. The method of claim 1, wherein the first weight value or the second weight value is determined based at least in part on a respective timestamp of the first location signal or the second location signal.

9. The method of claim 1, wherein the confidence scores are dynamically determined based on vehicle status including any of: in land transportation, in air transportation, docked at a docking station, or checked out by a user device.

10. The method of claim 1, further comprising:
determining that the first location signal and the second location signal are inconsistent; and
applying a pre-defined priority rule to the first location signal and the second location signal, wherein the pre-defined priority rule applies a higher confidence score to the first location signal or the second location signal based on a reliability level of the first location signal or the second location signal.

11. A method of determining a location of a personal mobility vehicle, the method comprising:
receiving, from the personal mobility vehicle, a global navigation satellite system (GNSS) signal indicating GNSS coordinates of the personal mobility vehicle;

receiving, from the personal mobility vehicle or an external location source in the environment external of the personal mobility vehicle, a message indicating wireless location data of the personal mobility vehicle, wherein the external location source is configured to communicate with the personal mobility vehicle or a fleet management system;

generating a geolocation query input based at least in part on the GNSS coordinates and the wireless location data;

determining a first estimated location of the personal mobility vehicle by blending the GNSS signal and a location signal determined based on the wireless location data using one or more machine-learning models;

determining a second estimated location of the personal mobility vehicle based on movement data of the personal mobility vehicle;

generating, a geolocation indication of the personal mobility vehicle in response to the geolocation query input based at least on contextual data associated with the environment external of the personal mobility vehicle using the one or more machine-learning models, wherein the geolocation indication is determined based on a first weight value associated with the first estimated location and a second weight value associated with the second estimated location, and wherein the first weight value and the second weight value are based on confidence scores determined based on at least vehicle status data received from the personal mobility vehicle or a device associated with the personal mobility vehicle; and associating the geolocation indication with the personal mobility vehicle according to a first timestamp.

12. The method of claim 11, further comprising:
receiving, from the personal mobility vehicle, a real-time kinematics (RTK) positioning signal indicating RTK positioning coordinates of the personal mobility vehicle; and
combining the RTK positioning coordinates into the geolocation query input.

13. The method of claim 11, further comprising:
determining that a most recent vehicle status of the personal mobility vehicle indicates that the personal mobility vehicle is checked out through a user device;
obtaining, via a client component on the user device, device location data of the user device; and
combining the device location data into the geolocation query input.

14. The method of claim 11, wherein the geolocation indication is generated by the one or more machine-learning models, and wherein the one or more machine-learning models are pre-trained by a training dataset of location data artifacts, each location artifact including a GNSS location of the personal mobility vehicle, a Wi-Fi location of the personal mobility vehicle, and a ground-truth location of the personal mobility vehicle.

15. The method of claim 11, further comprising:
determining a vehicle status of the personal mobility vehicle based on most recent log data associated with the personal mobility vehicle,
wherein the vehicle status includes one of:
in a warehouse,
in transportation,
docked at a docking station, or
checked out by a user device; and
determining whether the vehicle status matches with the generated geolocation indication.

16. The method of claim 11,
wherein the movement data is received from an inertial measurement unit of the personal mobility vehicle, and
wherein the movement data indicates a velocity and/or a direction of movement of the personal mobility vehicle, further comprising:
determining whether the movement data matches with the generated geolocation indication.

17. The method of claim 16, further comprising:
receiving, from the personal mobility vehicle, wheel ticking data captured by a wheel tick sensor installed with the personal mobility vehicle; and
combining the wheel ticking data into the received movement data.

18. The method of claim 11, further comprising:
in response to determining that at least two factors from a group of the generated geolocation indication, a logged vehicle status, and the movement data of the personal mobility vehicle match with each other:
applying one or more pre-defined priority rules to the generated geolocation indication, the logged vehicle status, or the movement data of the personal mobility vehicle;
determining a geolocation of the personal mobility vehicle based on an application of the one or more pre-defined priority rules;
determining a respective timestamp associated with each factor from the group; and
selecting a factor from the group associated with a latest timestamp for geolocation determination.

19. The method of claim 11, further comprising:
in response to determining that the personal mobility vehicle is being engaged with a user device, sending the geolocation indication associated with a vehicle identifier to a client application on the user device to update location usage of the client application.

20. A system of determining a location of a personal mobility vehicle, the system comprising:
a communication interface configured to:
receive, from the personal mobility vehicle, a global navigation satellite system (GNSS) signal indicating GNSS coordinates of the personal mobility vehicle, and
receive, from the personal mobility vehicle or an external location source in the environment external of the personal mobility vehicle, a message indicating wireless positioning data of the personal mobility vehicle, wherein the external location source is configured to communicate with the personal mobility vehicle or a fleet management system;
a memory storing a plurality of processor-executable instructions; and
a processor executing the plurality of processor-executable instructions to:
generate a geolocation query input based at least in part on the GNSS coordinates and the wireless positioning data;
determine a first estimated location of the personal mobility vehicle by blending the GNSS signal and a location signal determined based on the wireless positioning data using one or more machine-learning models;
determine a second estimated location of the personal mobility vehicle based on movement data of the personal mobility vehicle;
generate a geolocation indication of the personal mobility vehicle in response to the geolocation query input based at least on contextual data associated with the environment external of the personal mobility vehicle using the one or more machine-learning models, wherein the geolocation indication is determined based on a first weight value associated with the first estimated location and a second weight value associated with the second estimated location, and wherein the first weight value and the second weight value are based on confidence scores determined based on at least vehicle status data received from the personal mobility vehicle or a device associated with the personal mobility vehicle; and
associate the geolocation indication with the personal mobility vehicle according to a first timestamp.

\* \* \* \* \*